(12) United States Patent
Kidd et al.

(10) Patent No.: US 11,726,447 B2
(45) Date of Patent: Aug. 15, 2023

(54) QUALITY REVIEW MANAGEMENT SYSTEM WITH CONFIGURABLE EXCEPTION RULES

(71) Applicant: FISHER-ROSEMOUNT SYSTEMS, INC., Round Rock, TX (US)

(72) Inventors: Joshua B. Kidd, Safety Harbor, FL (US); Marcus Shane Strangeway Orchard, Osprey, FL (US); Todd A. Cook, St. Petersburg, FL (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 333 days.

(21) Appl. No.: 17/063,418

(22) Filed: Oct. 5, 2020

(65) Prior Publication Data

US 2021/0019685 A1 Jan. 21, 2021

Related U.S. Application Data

(63) Continuation of application No. PCT/US2019/028138, filed on Apr. 18, 2019.
(Continued)

(51) Int. Cl.
*G05B 19/406* (2006.01)
*G05B 19/042* (2006.01)
(Continued)

(52) U.S. Cl.
CPC ......... *G05B 19/406* (2013.01); *G05B 19/042* (2013.01); *G05B 19/0428* (2013.01);
(Continued)

(58) Field of Classification Search
CPC .. G05B 1/00–24/00; G06F 1/00–40/00; G06N 3/00–20/00; G07C 1/00–13/00; G06Q 10/00–50/00
(Continued)

(56) References Cited

U.S. PATENT DOCUMENTS 663,378 A 12/1900 Witten
6,298,454 B1 * 10/2001 Schleiss ............. G05B 23/0227
714/37
(Continued)

FOREIGN PATENT DOCUMENTS

WO WO-2018/031769 A1 2/2018

OTHER PUBLICATIONS

Examination Report for Application No. GB2016643.5, dated May 5, 2022.
(Continued)

*Primary Examiner* — Alan S Miller
(74) *Attorney, Agent, or Firm* — Marshall, Gerstein & Borun LLP

(57) ABSTRACT

A quality review management system may be used to analyze the operation of manufacturing processes within a plant based on data collected by various data sources in the plant, such as batch executive applications, to automatically detect, store, and display exceptions within those processes for use by a quality review engineer to determine if the process operation meets certain quality standards. The quality review management system includes a configuration application that enables a user to create one or more exception rules, an exception engine that analyses process data using the rules to detect one or more exceptions within the process, and a review application that enables quality review personnel to review each determined exception for resolution purposes.

53 Claims, 14 Drawing Sheets

Related U.S. Application Data

(60) Provisional application No. 62/659,325, filed on Apr. 18, 2018.

(51) Int. Cl.

| | |
|---|---|
| G06N 5/022 | (2023.01) |
| G06Q 10/0631 | (2023.01) |
| G06Q 10/0639 | (2023.01) |
| G06Q 10/10 | (2023.01) |
| G06Q 50/04 | (2012.01) |
| G07C 3/14 | (2006.01) |
| G06F 9/445 | (2018.01) |
| G06F 16/22 | (2019.01) |
| G06F 16/26 | (2019.01) |
| G06Q 10/067 | (2023.01) |
| G06Q 10/0875 | (2023.01) |
| G06Q 10/105 | (2023.01) |
| G06F 16/2455 | (2019.01) |
| G06F 16/248 | (2019.01) |
| G06Q 10/20 | (2023.01) |
| G06N 5/00 | (2023.01) |

(52) U.S. Cl.
CPC .......... *G06F 9/44526* (2013.01); *G06F 16/22* (2019.01); *G06F 16/248* (2019.01); *G06F 16/2455* (2019.01); *G06F 16/26* (2019.01); *G06N 5/00* (2013.01); *G06N 5/022* (2013.01); *G06Q 10/067* (2013.01); *G06Q 10/06311* (2013.01); *G06Q 10/06316* (2013.01); *G06Q 10/06395* (2013.01); *G06Q 10/0875* (2013.01); *G06Q 10/103* (2013.01); *G06Q 10/105* (2013.01); *G06Q 10/20* (2013.01); *G06Q 50/04* (2013.01); *G07C 3/146* (2013.01); *G05B 2219/23101* (2013.01); *G05B 2219/23335* (2013.01); *G05B 2219/32368* (2013.01)

(58) Field of Classification Search
USPC ............................................... 705/7.11–7.42
See application file for complete search history.

(56) References Cited

U.S. PATENT DOCUMENTS

| | | | |
|---|---|---|---|
| 2003/0158795 A1 | 8/2003 | Markham et al. | |
| 2006/0047454 A1* | 3/2006 | Tamaki | G06Q 10/06 702/84 |
| 2007/0005266 A1* | 1/2007 | Blevins | G06Q 50/04 702/22 |
| 2007/0168753 A1* | 7/2007 | Herter | G06F 11/079 714/E11.027 |
| 2007/0174225 A1* | 7/2007 | Blevins | G06F 9/451 340/3.9 |
| 2009/0248173 A1 | 10/2009 | Sasko et al. | |
| 2010/0125756 A1* | 5/2010 | Egetoft | G06F 9/4488 714/38.1 |
| 2012/0083917 A1 | 4/2012 | Zhou et al. | |
| 2014/0047107 A1* | 2/2014 | Maturana | G05B 15/02 709/224 |
| 2016/0070246 A1 | 3/2016 | Nakagawa et al. | |
| 2016/0334765 A1* | 11/2016 | Duca | G05B 19/4186 |
| 2017/0102678 A1 | 4/2017 | Nixon et al. | |
| 2017/0102694 A1* | 4/2017 | Enver | G05B 19/4184 |
| 2017/0160733 A1 | 6/2017 | Oostendorp et al. | |
| 2017/0236067 A1* | 8/2017 | Tjiong | G06F 3/048 706/11 |
| 2017/0249285 A1 | 8/2017 | Stewart et al. | |
| 2017/0364060 A1 | 12/2017 | Nikhra et al. | |
| 2018/0074482 A1* | 3/2018 | Cheng | G05B 23/027 |
| 2018/0131765 A1 | 5/2018 | Puleston et al. | |
| 2018/0357334 A1 | 12/2018 | Chao et al. | |

OTHER PUBLICATIONS

Examination Report for Application No. GB2017156.7, dated May 16, 2022.
International Search Report and Written Opinion for Application No. PCT/US2019/028138, dated Jul. 17, 2019.
Combined Search and Examination Report for Application No. GB2016027.1, dated Apr. 1, 2021.
Combined Search and Examination Report for Application No. GB2016643.5, dated Apr. 1, 2021.
Combined Search and Examination Report for Application No. GB2017156.7, dated Apr. 1, 2021.
Examination Report for Application No. GB2016013.1, dated Apr. 1, 2021.
International Preliminary Report on Patentability for Application No. PCT/US2019/028138, dated Oct. 20, 2020.
Combined Search and Examination Report for Application No. GB2114208.8, dated Dec. 1, 2021.
Examination Report for Application No. GB2016013.1, dated Mar. 22, 2022.
Yu, "Development of MES-based Real Time Statistical Process Quality Monitoring System," IEEE International Symposium on Knowledge Acquisition and Modeling Workshop, pp. 7-10 (2008).

* cited by examiner

Quality Review Manager Overview Order     Sam Jones Administrator

SJ_MR_Basic_RA_Recip... ← 508

○ MR Basic RA Recipe for testing WF
★ Released

ⓘ ≡ ▭

Manage Exceptions

0%   0 out of 11 total exceptions are closed

Complete the Order

0%   0 out of 1 associated workflows are completed

Verify and sign

QA Review Started
LRD 20180226
QA Review Approved

← 530

Sort by: Creation Date ▼ ↓ ≡

⊕

0060
☐ Workflow Comment
Severity Low
Source Workflow v49
Created 2018-02-28 02:24:27

← 506

Workflow Comment ✕

Status   Severity     CAPA     Group
NEW   LOW ✏   ✏     ✏

Exception Id   Source         Created
0060         Workflow v49   2018-02-28 02:24:27

Description

A built in rule in the workflow plugin that represents a comment being added to a workflow

---

Basic display options for parameters
WI_DISPLAY_OPTIONS:1
View the Activity
Iteration: 1
Parent: MOP_BASIC_RA_RECIPE:1
Parent Description: MOP, simple RA recipe

This instruction demonstrates basic display options for parameters:
Display Only - Displays the parameter only. No manual entry/editing is allowed.
Optional - A value is not required to advance to the next instruction.
Required - A value is required in order to execute the instruction successfully.
Do Not Display - does not display unless the instruction is forced or voided (appears in the Void dialog only).

1 - Attempt to alert the value in the Display Only parameter. No entry is allowed.
2 - Attempt to execute the instruction without entering any values. An error should appear for the required parameter.
3 - Enter a value in the required parameter field only and execute. Execution is allowed.
4 - Observe the values recorded in the fields after execution. All values should be saved

Quality Review Manager  Overview  Order                                     Q Sam Jones Administrator ⌄

SJ_MR_Basic_RA_Recip...  — 508
⊖ MR Basic RA Recipe for testing WF
★ Released

ⓘ  📎  ▭  ⊡

Manage Exceptions
0%  0 out of 1 total exceptions are closed

Complete the Order
0%  0 out of 1 associated workflows are completed

Verify and sign
QA Review Started
LRD 20180226
QA Review Approved

Sort by: Creation Date ▼ ⇅≡ — 506
(+)

0060
☐ Workflow Comment
Severity Low
Source Workflow v49
Created 2018-02-28 02:24:27

— 530

Version Number
2 View previous versions — 532
*Resolution Name
Standard
Description — 534
An optional description for the resolution

*Stage Name
Manufacturing — 536
*Severity — 538
Low ▼
Signatures — 539     Signature Names
Operator ▼  Operator 1
Operator ▼  Operator 2
+ Add a signature                    ✕

*Stage Name
Manufacturing Supervisor — 536
*Severity — 538
Medium ▼
Signatures — 539     Signature Names
Supervisor ▼  Manufacturing Supervisor
+ Add a signature                    ✕

FIG. 8F

Quality Review Manager — Sam Jones Administrator order1
⊕ BOM-1
★ Released

Manage Exceptions
(9%) 1 out of 11 total exceptions are closed

Complete the Order
(0%) 0 out of 1 associated workflows are completed

Verify and sign
Operator

Overview  Order

570 Sort by: Creation Date ▼

○ First Group  This is a group  ○
○ Second Group  Use this one  ②
○ tester  this is a test group  ①

1036 ☐ Parameter Out of Range
Severity Low
Source Workflow
Created 2018-01-11 04:05:01

1038 ☐ Parameter Out of Range
Severity High
Source Workflow
Created 2018-01-18 08:18:48

1039 ☐ Parameter Out of Range
Severity New
Source Workflow
Created 2018-01-24 12:59:36

← 506

580 → tester
this is a test group
Created 2018-02-28 01:3:57   Total Exceptions 1

Severity — 582
set the severity of each exception
(LOW ▼) ← 584

CAPA
set the CAPA associated to each exception
(Set a CAPA) ← 586

Comment
add a comment to each exception
(Add a comment) ← 588

Attachment
add an attachment to each exception
☐ Browse to attach a file ← 590

Sign and Close
To close exceptions, all required signatures must be collected ← 592

Quality Review Manager Overview Order  ⌕ Sam Jones Administrator ⌵ order1
- BOM-1
- ★ Released

ⓘ 🔗 🖥 ⊡

Manage Exceptions
(9%) 1 out of 11 total exceptions are closed

Complete the Order
(0%) 0 out of 1 associated workflows are completed

Verify and sign
Operator

Sort by: Creation Date ▼ ↓≡

◈ First Group — This is a grou...
◈ Second Gro — Use this one
◈ tester — this is a test ...

＋

1036 ☑ Parameter O
Severity Low
Source Work
Created 2018

1038 ☑ Parameter O
Severity High
Source Work
Created 2018

1039 ☐ Parameter O
Severity New
Source Work
Created 2018

← 506

↗ 592

Mock Parameter Out of Range  ⌄ ✕
Status  Severity  CAPA  Group
ACTIVE  LOW ✎  456 ✎  ✎     ← 594

Group Actions (2 exeptions selected)
⊙ These exceptions aren't in a group together.
What would you like to do?
exception can be joined into groups by a common resolution to
help organize the exeptions for group actions        Hide these actions
↱ Create a new group
⇄ Move into an existing group

Severity
set the severity of each exception
✎ ( Choose a severity )

CAPA
set the CAPA associated to each exception
✎ ( Set a CAPA )

Comment
add a comment to each exception
✎ ( Add a comment )

Attachment
add an attachment to each exception
✎ ( ☐ Browse to attach a file )

Sign and Close

FIG. 8G

QUALITY REVIEW MANAGEMENT SYSTEM WITH CONFIGURABLE EXCEPTION RULES

RELATED APPLICATION

This application is a continuation application that claims the benefit of International Application Serial No. PCT/US19/28138, entitled "Quality Review Management System," filed Apr. 18, 2019, which claims the benefit under 35 U.S.C. § 119(e) of U.S. Provisional Patent Application Ser. No. 62/659,325, entitled "Quality Review Management System," filed Apr. 18, 2018, the entire disclosures of which are hereby expressly incorporated by reference herein.

FIELD OF TECHNOLOGY

The present invention relates generally to manufacturing management systems and, more particularly, to quality review management systems that enable advanced quality review procedures with respect to operations of plants, processes, batches, and other activities implemented in manufacturing plants.

DESCRIPTION OF THE RELATED ART

Manufacturing plants, such as process plants, typically produce one or more products from a set of raw or pre-processed materials. In many cases, the produced product must be of a certain quality or must be manufactured according to one of various different quality standards to meet customer requirements, industry standards, the Food and Drug Administration (FDA) requirements, safety requirements, labeling requirements, etc. In many cases, separate quality review personnel are tasked with implementing various activities associated with assuring that the produced product meets a set of pre-established standards or requirements or was manufactured to a particular standard. Such activities may include reviewing the states or the values of various parameters of the manufacturing equipment, materials, or processes used to make the product to assure appropriate manufacturing steps were implemented, that the product was made under various desirable conditions, such as within certain temperature ranges, PH ranges, pressure ranges, etc. Of course, these quality review tasks are dependent on the type of product being made, the manufacturing process or equipment used to make the product, the quality standards that are being met, etc. As such, quality review is a highly specialized activity in many manufacturing environments, requiring intimate knowledge of the product, the manufacturing process, and the quality standards.

As an example, batch processes are typically used to make various types of food or drug products that are highly regulated by various food and drug industries or organizations, such as the FDA. The specific process steps and conditions under which these products are made are typically set or regulated in some manner to assure the safety of the produced product or to assure that the product meets certain labeling criteria (e.g., that the product is gluten free, Kosher, etc.) As an example, the process steps used to make a product may require or mandate that certain process steps be implemented on the raw or intermediate materials during the manufacturing process, that certain cleaning procedures be implemented on the process equipment within or between manufacturing steps of the manufacturing process, that various parameters, such as temperatures, pressures, PH balances, etc., be maintained within certain ranges or above or below certain thresholds throughout the process or during critical times of the process, etc. As a result, in many cases, the product manufacturer needs to collect and store data regarding the actual operation of the manufacturing equipment during the manufacturing process to be able to prove to a regulating authority or customer that the produced product meets the appropriate quality standards, for example, that the product was produced according to or under pre-established procedures or conditions.

Process plants that are used to make various types of products, such as food, petroleum, drug, etc. products are generally complex and highly automated. In particular, industrial process plants, such as those used in chemical, petroleum refining, food manufacturing, drug manufacturing, or other processes, generally include one or more process control networks having centralized or distributed process controllers communicatively coupled to one or more field devices which may be, for example, valve positioners, switches, sensors (such as temperature, pressure and flow rate sensors), tanks, mixers, heaters, etc. These field devices or field equipment may perform physical control functions within the process plant (such as opening or closing a valve, stirring or mixing materials within a tank, heating a container, etc.), may take measurements within the process plant for use in controlling the operation of the process plant, or may perform any other desired function within the process plant. Process controllers have historically been connected to field devices via one or more analog signal lines or buses which may carry, for example, 4-20 mA (milliamp) signals to and from the field devices. In the past couple of decades or so, however, the process control industry has developed a number of standard, open, digital or combined digital and analog communication protocols such as the Foundation™ FIELDBUS (hereinafter "Fieldbus"), HART®, PROFIBUS®, WORLDHP®, Device-Net® and CAN protocols which can be used to implement communications between process controllers and field devices. Generally speaking, a process controller receives signals indicative of measurements made by one or more field devices and/or other information pertaining to the field devices, uses this information to implement a typically complex control routine, and generates control signals which are sent via the signal lines or buses to the field devices to thereby control the operation of the process plant.

Certain types of process control networks, such as those used in batch processes, typically include multiple sets of replicated equipment, with each set of equipment being designed to have the same or similar hardware that performs essentially the same basic function within the process plant. Thus, for example, a cookie manufacturing plant may have multiple sets of mixing equipment, multiple sets of baking equipment, and multiple sets of packaging equipment, with some or all of the individual mixing equipment being capable of operating in parallel and of being connected to operate in series with some or all of the baking equipment and the packaging equipment. In such a system, it is typical to use the same general control algorithm or routine to control the operation of any particular set of replicated equipment to make the same product (as defined by a specific batch recipe). Thus, any particular batch run, which is defined by an order, that specifies or identifies a particular amount of a particular type of product being manufactured, may be implemented on any combination of various different sets of equipment in the plant. Typically, each such batch run or order includes a specific control procedure that performs a number of different steps or stages in sequence to implement a recipe, finishing the first stage before beginning the second stage and so on. Thus, in the cookie manufacturing plant described above, a batch run or order may implement a batch control procedure to control the mixing equipment, may then implement a procedure to run the baking equipment on the product made by the mixing equipment and may then execute a third procedure that controls the packaging equipment to package the product produced by the baking equipment, each step of which takes a finite amount of time. In many cases, a batch run also implements procedures to clean, empty, fill, etc. tanks or other containers or equipment in the plant as part of each order. Of course, each order may have a different set of specifications, which may require a different set of raw materials, a different recipe, different flow or batch procedures to be implemented on the raw materials, and even different quality standards.

One batch control standard that has been promulgated by the International Society for Measurement and Control, an international organization concerned with issues of process control, is entitled Batch Control Part 1: Models and Terminology, and is often referred to as the ISA S88.01-1995 standard, or one of its updates (referred to herein as the "S88 standard"). The S88 standard defines models of equipments and procedures for use in automated batch processes, and defines certain terminology for use in referring to those models and their elements. For example, the S88 standard defines a "batch process" as a process that leads to the production of finite quantities of material by subjecting quantities of input materials to an ordered set of processing activities over a finite period of time using one or more pieces of equipment. As another example, a "batch" is defined by the S88 standard as the material that is being produced or has been produced by a single execution of a batch process.

As noted above, batch processing equipment (e.g., controllable elements such as valves, heaters, mixers, etc.) is operated during a batch process or a batch run according to pre-defined procedures to make a batch. All such batch processing equipment is referred to synonymously herein as equipment, equipment modules, processing equipment, and/or physical elements. The procedures to operate such physical elements are often referred to by the S88 standard as the "procedural model." According to the S88 standard, the procedural model is structured as a hierarchical ranking of procedures, with the highest level encompassing each of the lower levels, the next highest level encompassing each of the levels below it, and so on. The levels of the S88 procedural model of particular interest include, in descending order, "procedures," "unit procedures," "operations," and "phases." The terms "procedural element" or batch sub-procedures are used herein to refer to any embodiment or implementation of any of these levels of the S88 procedural model as well as to any other hierarchical definition of a set of batch procedures.

As indicated above, the highest-level S88 procedural element of interest is referred to as a procedure, which is made up of one or more unit procedures. Each unit procedure is or can be in turn made up of one or more operations, which are each in turn made up of one or more phases. Moreover, the S88 procedural model does not preclude the definition and use of other hierarchical levels in particular applications. Rather, the S88 standard and the procedural elements referred to herein are intended to provide a broad, standardized model for describing the procedures followed in automated batch-process control, and these elements are not limited to the four procedural elements defined by the S88 standard.

The different procedural elements of a batch are generally implemented in practice as computer programs that are executed by and within data-processing devices, including personal computers, workstations, and programmable controllers. Execution of a typical procedural element results in an electrical or optical output from the data-processing device that can be used to control a physical element, typically by connecting an output of the data-processing device to the physical element directly, or indirectly over a local-area or wide-area network. A procedural element performs an assigned or associated task by invoking "basic control" with respect to at least one physical element. This type of control is typically dedicated to establishing and maintaining a specific desired state of the physical element. Basic control would include, for example, starting or maintaining a flow of material in a storage bin element, heating the starting materials in a polyvinyl chloride reactor element, etc. In practice, the lower levels of the procedural model (namely phases) perform the actual communications with the actual physical elements, thereby invoking or performing basic control. The higher levels of the procedural model are essentially abstractions to improve the organization and the structure of the procedural model, as well as the physical model.

Moreover, many batch systems use a batch executive to control the operation of one or more batches in a plant according to the procedural model being used. The batch executive may be or use a state machine model as a logical construct to describe the state of a batch process or activity. The state machine model describes or defines a number of process states, together with actions that cause transitions between those states. A state machine model of a process is said to be in a particular state due to an earlier transition into that state. When a particular event occurs or a particular status is sensed, the state machine model makes a transition to another state corresponding to the particular event or sensed status. State machine models are useful techniques for defining and implementing the operation of procedural elements of a batch process. In particular, a procedural element defined and implemented as a state machine initiates an action, for example, when its associated state machine makes a transition from an old state to a new state.

Of course, the S88 standard permits the definition and implementation of procedural elements in accordance with a standard state machine model. While the S88 standard does not mandate this approach, this approach has been broadly adopted in the process control industry to enable a higher degree of interoperability among the products of various vendors. One present commercial application of the S88 standard having procedural elements defined and implemented according to a state machine model is the DeltaV™ Batch product from Emerson Process Management. In DeltaV™ Batch, a server program or a batch executive program runs on the data processing device that executes the various procedural elements. The server or batch executive program (referred to as a "batch executive") coordinates execution of procedural elements in accordance with one or more state machine models so that procedures, corresponding unit procedures, corresponding operations, and corresponding phases are sequenced through their respective steps by the server program. In any event, during the implementation of a particular batch run or a particular batch process associated with an order, such as when a phase is initiated by the server program, the phase communicates the initiation request to the phase logic interface within a programmable controller. The programmable controller then executes the actual state logic or control routine for the phase and provides the required process control via communications to the process equipment.

As will be understood from the previous discussion regarding quality review of processes, it is desirable to gather data representative of the operation of a batch process, including historical events that make up the processing of a batch run in order to be able to determine if the batch run for an order operated or executed satisfactorily according to the applicable quality standards. Such historical data may be useful not only for quality review purposes, but for determining trends in quality control or for determining when equipment used in the batch process is in need of service. A number of types of data are potentially useful in reviewing the quality or progress of a batch process. One such source of data is continuous data generated by the various data points in the batch process during the processing of the batch. A data point is a single source of such continuous data that reflects some control value or other status or measurement of the batch process. For example, a particular level of a material flow or a temperature of a material as measured by a sensor might be such data points. A present setting of a control valve, the time at which a sample was taken, etc. may be other data points. Each such data point may have a continuous stream of data values sensed or controlled over time by the batch process application associated therewith. The aggregation of all such continuous data, generated during processing of a batch, is often logged by a batch processing system and stored as part of a batch log file in a batch database. These batch log records usually include a timestamp and a present value along with other identifying information for the data point such as a tag to identify the source of the data.

Another type of data useful in reviewing the quality or progress of a batch process is batch state and event information, which relates to or includes information that describes the batch process in terms of execution of the procedural model (e.g., the state of the batch process, transitions between states of the batch model, etc.). For example, batch events that describe the start and end time of a particular phase or a particular operation, unit procedure or procedure of the procedural model constitute event information. Event information also includes process events, including information generated by the physical elements of the batch process or by an operator. In particular each equipment module, cell, etc. of a process may generate process events that indicate one or more specific activities in the starting, stopping, or running of a particular phase (i.e., performing specific basic control actions). Alarm and event conditions recognized by the process equipment are further examples of process events. Process events may also include information regarding operator changes to the batch process made during operation of the batch process.

Still further, many batch process systems utilize an operator interface program, operated on a dedicated operator interface device, such as a workstation, to enable an operator to view the current state of a batch run, to take manual steps within the batch run, such as setting various parameters manually, selecting process equipment for execution of various batch procedures, operations, phases, etc., making notes regarding unexpected activities or conditions during a batch run or order, etc. One such operator interface program is known as a workflow program (such as the Syncade Workflow program provided by Emerson Automation Solutions) which intercepts or receives various information from the batch executive or process equipment (e.g., process controllers) used to implement a batch run for each order being processed. The workflow programs may subscribe to various types of data from the batch executive or process control system and may present this data to the operator to enable the operator to view the current state of the batch run, to view transitions between states in the batch model, to make changes in the batch run, to manually stop and start various batch procedures, operations, phases, or equipment, and to deal with problems or unexpected events that arise within a batch run. For example, in many cases, unexpected errors or problems may occur within a batch run, such as batch equipment or raw materials being unexpectedly unavailable, process parameters being out of an expected or desired range, etc. In these cases, the workflow program enables the operator to make and implement decisions as to how to proceed, such as skipping a batch step or procedure, specifying other equipment or materials to use, changing process plant variables, setpoints, or parameters to deal with alarms or events in the process, etc. Generally speaking, the workflow program also stores data indicative of operator actions within the batch log file, along with the raw batch data being stored in the batch log file. In many cases, the workflow program also enables the operator to make notes or to store explanations of what was happening in the batch at the time of the action, why the operator took the particular action, etc., and these notes are stored in the batch log file as well.

In any event, in many industries, after a batch run has occurred and a product or order has been completed, a quality engineer or other quality personnel (referred to generally herein as quality engineers) must verify that the product meets the appropriate quality standards. To perform this review, the quality engineer accesses and views the batch log file for the batch run of an order (typically on an order by order basis) to assure that the batch run completed according to or within expected parameters, workflows and ranges. Generally, to perform this review, the quality engineer must scroll through the raw data in the batch data file looking for "exceptions" to the expected operation of the batch run. The term "exception" is generally used herein to indicate a deviation from an expected procedure, process, step, workflow, range, value, etc. within a manufacturing process or plant. Exceptions may be, for example, one or more process variables or parameters being out of an expected or desired range, or above or below expected or desired thresholds, a batch procedure, operation or phase being skipped or performed out an expected sequence, a batch procedure, operation or phase stopping or starting at unexpected times, or taking longer or shorter than an expected operation time, different or unexpected materials being used in a batch procedure, additional steps or actions being implemented by the operator during the batch run, changes to a recipe, notes generated by the operator during a batch run, alarms and events that occurred during a batch run, etc.

In any event, the quality engineer must identify the exceptions based on the raw data stored in the batch log file, must then determine an effect or severity of each such exception, and what if any procedures to take to handle or "close" the exception. For example, in many cases, exceptions may only represent minimal or unimportant deviations in the expected batch run that do not result in any or in any significant quality reduction of the produced product according to the quality standards being implemented. In other cases, exceptions may need to be documented for later review by authorized agencies or by the customer, but may not be severe enough in their effect to result in a significant reduction of the quality of the product. In still other cases, the exception may be significant or important enough that the product needs to be put through one or more additional procedures to assure the desired quality, or to require that one or more tests be performed on the product to assure the quality of the product. In still other cases, the quality engineer may determine that, based on the specifics of the exception, the product needs to be scrapped, or that the product needs to be marketed under a lower quality or labeling standard.

The process of looking through a batch log file for exceptions is highly tedious and fraught with problems. In particular, most of the data within the batch log file is not indicative of an exception, and so the quality engineer spends a significant amount (usually most) of the review time looking at data that is not actually associated with any exception. Still further, the quality engineer must keep in mind all of the conditions that lead to an exception, including for example, desired values or ranges of important process variables, the expected order of batch procedures, the expected stop and start times for various different batch procedures, etc. While the existence of batch process alarms and alerts or notes from the operator that are stored in the batch log file may indicate the existence of an exception, this is not always the case and, of course, not every exception that occurs may be documented with an operator note or may rise to a level that causes an associated alarm or alert to be generated in the control system. As will be understood, the actual exceptions that are determined are thus dependent on the skill of the particular quality engineer performing the review and the particular quality standards being met.

Still further, when the quality engineer finds an exception (e.g., a process value being out of range, etc.), the engineer must usually determine the context of the batch at the time of the exception in order to determine the severity of the exception, and how to best respond to or handle the exception. This process may involve obtaining additional data about the state of the batch run or batch procedure at the time of the exception, values of other process variables at the time of the exception, determining if alarms or events were generated in the same or other process equipment at the time of the exception, etc. This process then generally requires the quality engineer to use other available data access systems to determine the additional process state information at the time of the exception. This data acquisition activity can be time consuming and requires additional know-how on the part of the batch quality engineer.

For example, to view the operation of a batch from a batch log file, it is not a simple task to obtain a snapshot of the batch process at a particular time and display that data to a quality engineer, as the batch process has various different procedural elements, which may be run on different equipment within the plant at different times, using different setpoints, settings, etc. Instead, to view a batch run, the quality engineer may need to review and analyze data from the batch at various times related to the procedural events of the batch (i.e., the sub-procedures and sub-processes associated with the batch) to thereby be able to understand the operation of the batch run at the time of the exception. While various batch data is typically automatically collected and stored during operating of the batch run, these different types of data are generally collected by different subsystems and, in fact, may be stored in different databases. This fact makes it difficult for the quality engineer to have a comprehensive view of any particular batch process. For example, data such as alarm data and sensor measurement data which is obtained from actual field devices such as sensors, valves, etc. within the batch process are typically stored in a data historian as time-stamped data and are available from the data historian generally based on the time at which the data was collected. However, a different database, such as one associated with a batch executive routine, may store the start and end times of a batch run and the various different sub-procedures or procedural elements within the batch run. This all makes it more difficult for the quality engineer to understand the context of an exception without significant data lookup in various other subsystems of the batch process.

SUMMARY

A quality review management system (also referred to as a review by exception (RBE) system) may be used to analyze the operation of one or more manufacturing processes as collected by various other process plant data sources, such as data sources within a process control system, workflow applications, batch process operator applications, batch executive applications, etc. The quality review management system automatically detects exceptions within those processes and stores data pertaining to the detected exceptions in an organized and easily reviewable manner. The quality review management system also enables a quality review manager or engineer to review and handle (resolve) exceptions associated with the process in an easy to use interface.

More particularly, the quality review management system includes a configuration system that enables a user to create and store rules, in a rules database, that may be used to automatically identify one or more exceptions within a process, such as a batch process. The rules may identify a set of conditions that must be met to identify an exception, the severity of the identified exception, information about the exception, processes or procedures used to handle, resolve, or close the exception, process data or other data to be stored as part of an exception record to assist a quality review engineer in understanding and resolving the exception, etc. The quality review management system also includes an exception engine that processes data within a data message, such as a data message provided periodically by a data source, like a plant or process control system, a batch executive, an operator workflow application, etc., using the rules in the rules database to determine if the data within the data message includes an exception, as defined by any of the rules. The exception engine, upon identifying an exception, may then store information about the exception as an exception record, such as a name, a type, a severity of, procedures or steps to take to resolve or handle the exception, and process data pertaining to the operation of the process in which the exception occurred at the time that the exception occurred. The exception engine may store this and/or other data for each identified exception as an exception record in an exception file (e.g., an exception database) for each order. Moreover, the exception engine may operate in real time during operation of the process implementing an order to create an exception file or database for the order and may provide live feedback to a process operator that an exception has occurred or is about to occur.

Thus, in one example, the quality review system provides a configuration environment to enable a user to create configurable exception rules to execute in an exception engine to define or detect exceptions. The configuration environment may store a set of rule templates that may process various types of input data to detect an exception. In the configuration environment, a user may select one of the templates, may define inputs/outputs, and may define a possible expression to be analyzed for a set of data. When the data flows through the engine, it will analyze the data against the configured rules; if any rule's criteria is met, an exception is created. The exception may then be immediately checked. Typical known review by exception products require the exception software provider to hard code the exceptions defined for the system into the product, and thus require a software or system update to create new exceptions. These updates take time for the user to get and install, and do not enable users to customize their own systems.

The quality review management system also includes a review interface that enables a quality review engineer or other personnel to review and deal with exceptions as identified by the exception engine and as stored as exception records in an exception database for an order. In particular, the review interface may access an exception database for a particular order and may present information regarding each identified exception to the quality review engineer in an organized and easy to understand manner. The review interface may provide the quality review engineer with data stored for each exception record, such as a name, a type, and a severity identification for each exception record. The review interface may provide the reviewer with stored information about the exception as identified by the exception record, the type of exception, etc. as well as with data pertaining to various process or batch variables, states, procedures, etc. that existed at the time that the exception occurred. This information will enable the reviewer to easily understand the exception, the context of the process at the time that the exception occurred and the severity of the exception. Still further, the review interface may enable the reviewer to take various actions with respect to each exception. Such actions may include acknowledging the exception, signing off on or closing the exception, annotating the exception with further information such as why the exception can be ignored or signed off, sending the exception record to another person, etc. The review interface may also provide the reviewer with suggested actions, and may in some cases enforce particular actions, to be taken with respect to resolving or closing the exception. Such actions may include, for example, requiring sign-off by a certain number or type of people (e.g., the reviewer alone, the reviewer and a manager, two reviewers, etc.) Other actions may include requiring certain information to be provided from the reviewer, such as annotations, process information, etc. that will be stored with the exception record for later use by the customer, the quality reviewing authorities, etc.

The review interface may store the processed exception records in a database or file and may enable the reviewer to scroll through the exception records in the exception database to determine if and when all of the exception records for an order have been processed or closed, the status of the review (e.g., how many unprocessed exceptions exist in the exception record database), statistical data pertaining to the exception records (e.g., how may exceptions of each type or severity exist in the file, etc.) The review interface may also enable the reviewer to group exception records in various manners, such as by type, severity, processing status (e.g., unreviewed, reviewed but not closed, closed, etc.). Still further, the review interface may enable the reviewer to take one or more actions on an entire group of exception records, such as closing all of the exception records in a group, annotating all of the exception records in a group, etc.

In this manner, the quality review management system may be set up (configured) and executed during the operation of a batch process or other process to automatically identify exceptions, as they occur within a process run, may notify a process operator that an exception has occurred or that an action taken by the process operator will result in an exception, and may store all determined exceptions for a particular process (e.g., a batch process) in an exception record database. The quality review management system also enables a quality review engineer to quickly determine, view and deal with the exceptions within an exception database without needing to review a lot of raw data, as is currently necessary. Likewise, the quality review management system can enforce various rules in the exception handling or resolution process, such as assuring that exceptions of various different types or severities are processed or dealt with in a particular manner, thereby providing consistency in the quality review process.

Still further, the quality review management system may be implemented in a plug-in environment to enable the system to interface with and be used to analyze third party systems or applications for exceptions. In one case, a plug-in may be created or configured to obtain certain data from a third party application or data source and may then pass this data to an exception engine for processing by one or more exception rules. As one example, the quality review management system may be used to interface with event monitoring systems, such as those that use OPC interfaces, to obtain and analyze data from third party process control systems or plants.

In one example, the plug-in modules are created to interface the RBE exception engine with external or third-party systems (e.g., control systems, OPC interfaces, maintenance systems, etc.), thereby enabling exceptions to be generated based wholly or in part based on data from third party or external software systems. Plug-ins may be created to access particular data within or from a third party or external system and to pass this data to the RBE engine to analyze whether an exception should be created or not. The plug-ins may be run in the third-party server, in the RBE server or in another server, and may or may not perform exception detection. Thus, the plug-ins can be simple third-party system data gatherers, or may gather data and additionally perform some exception processing, providing an exception or pre-processed exception data to the RBE engine.

Known review systems are currently unable to interface with or create exceptions based on data provided directly from external software programs, like control systems, safety systems, maintenance systems, etc. Plug-ins make the RBE system much more robust in a complicated process environment having multiple different software systems operating during runtime.

Still further, in one example, an RBE system may include a live view component that collects a set of metadata (which may be predefined when, for example, creating a plugin) when collecting the RBE input data (that is, the process data used to define or generate an exception). The metadata may be any other process or environment data and is collected at the same time as the exception input data. This metadata is stored as a process snapshot associated with the accessed exception data. When the RBE system detects an exception based on the collected exception data, the RBE system also stores the metadata as part of the exception. The RBE system additionally displays some or all of the metadata when reporting the generated exception, thereby providing the user or reviewer with a live view into the process at the time that the exception arose within the process. This system provides the user with a quick view of various process states/values, etc. at the time of the exception, which enables the user the more quickly understand why the exception arose and the severity of the exception, thus enabling the user to more quickly process the exception.

While known process review products provide a list of generated exceptions to the user or reviewer, the reviewer must still analyze each exception to determine whether the exception can be dismissed or must be dealt with in some other manner. However, generally speaking, the reviewer must go back to the process system in which the data that lead to the exception was collected to understand other things about the process at the time of the exception (e.g., was the process on-line or off-line, the state of a batch at the time of the exception, etc.) With the live view feature, the user can be automatically provided with a process snapshot that will generally include the process data most useful to the reviewer in performing exception review, which means that the reviewer does not need to go back into other data collection systems to get the information the user needs to perform exception review. This feature also means that the reviewer does not generally need to be as familiar with the other process systems from which the data is collected as the reviewer will not need to use those systems to access the process data the reviewer needs In another example, an RBE or quality review system includes an event monitor that may be tied to a third party or external system and that generates and sends messages to the RBE system, which can then use these messages to perform exception processing or exception creation. In one case, the event monitor may be tied to or coupled to an OPC alert and alarm monitoring interface, and may recognize when one or more alerts or alarms are passed to the OPC interface. At this time, the event monitor creates and drops a message to the RBE system with the alert or alarm information and potentially any other desired OPC collected data. The RBE system may then analyze the messages to generate exceptions based on the alarms and alerts. Typical review system do not analyze data from third party systems, and none of them are connected to the OPC alert and alarm interfaces that exist. As such, these systems are not able to generate exceptions based on process alarms and alerts, for example.

Likewise, the quality review management system may use a new paging algorithm when presenting lists of exception records to a reviewer via an electronic display or user interface. This paging algorithm, which operates in a manner that reduces or eliminates the presentation of missing records or duplicate records in the review process, stores one or more anchors to track the actual records in the current display page of records being provided in an interface display. The system then uses the anchors for the page that is currently being displayed to determine the starting position of the next set or records to display as part of the next page, which enables the paging system to operate appropriately even as records are added to or are removed from the list of records to be displayed during the review process.

In one example, the review system implements a new paging algorithm when presenting lists of generated exceptions to a reviewer. Generally, RBE systems create/detect exceptions and store these exceptions as records in a structured database, such as an SQL database. Then, when presenting the list of exceptions to a reviewer on a display screen (and there can be a large number of exceptions or records), the RBE system searches the database for all relevant exception records, downloads pages of links to these records, and then presents records within portions of the retrieved pages in the order downloaded from the database as the user scrolls through the various pages of exception records. However, as the reviewer processes the exceptions and scrolls down the list of exceptions as displayed on the user interface, the records may change in the database, and thus the page data may become out of date. In particular, records may be added or may be deleted from the database. In this case, when the system attempts to present the records on a display screen, various records referred to in the pages may be missing, causing visual data loss or duplication. In some cases, the user may miss a record going from one page to the next due to the deletion of a record on a particular recovered page. In other cases, the system may become confused as to where to start a new display page based on missing records that were in the downloaded pages. The new system operates differently, in that it downloads records presented on a display screen starting from the last record displayed on the screen. That is, instead of presenting a new display page associated with the original pages of recovered records, the system accesses the database for a set of records that currently exist immediately after the last record on the displayed page, thereby assuring that each time a new set of records is displayed on the screen, the first new record displayed is the record immediately following the last record that was being displayed immediately before the time of the scroll.

This display system is more accurate as it assures that records are not displayed out of order or missed in the review process in which the user is scrolling down various pages of records over a long period of time. Moreover, the RBE system is more efficient as it only needs to access the database for the number of new records that will fit on a new display page as the user is scrolling through records, while still assuring that all of the relevant records are accessed as the user performs the scrolling process.

BRIEF DESCRIPTION OF THE DRAWINGS

FIGS. 8A-8G depict exemplary screen displays created by a review interface application or a configuration application of the quality review management system of FIG. 2 to enable a quality reviewer to perform various activities related to exception rule configuration and exception record viewing and handling.

DETAILED DESCRIPTION

Figure 1:
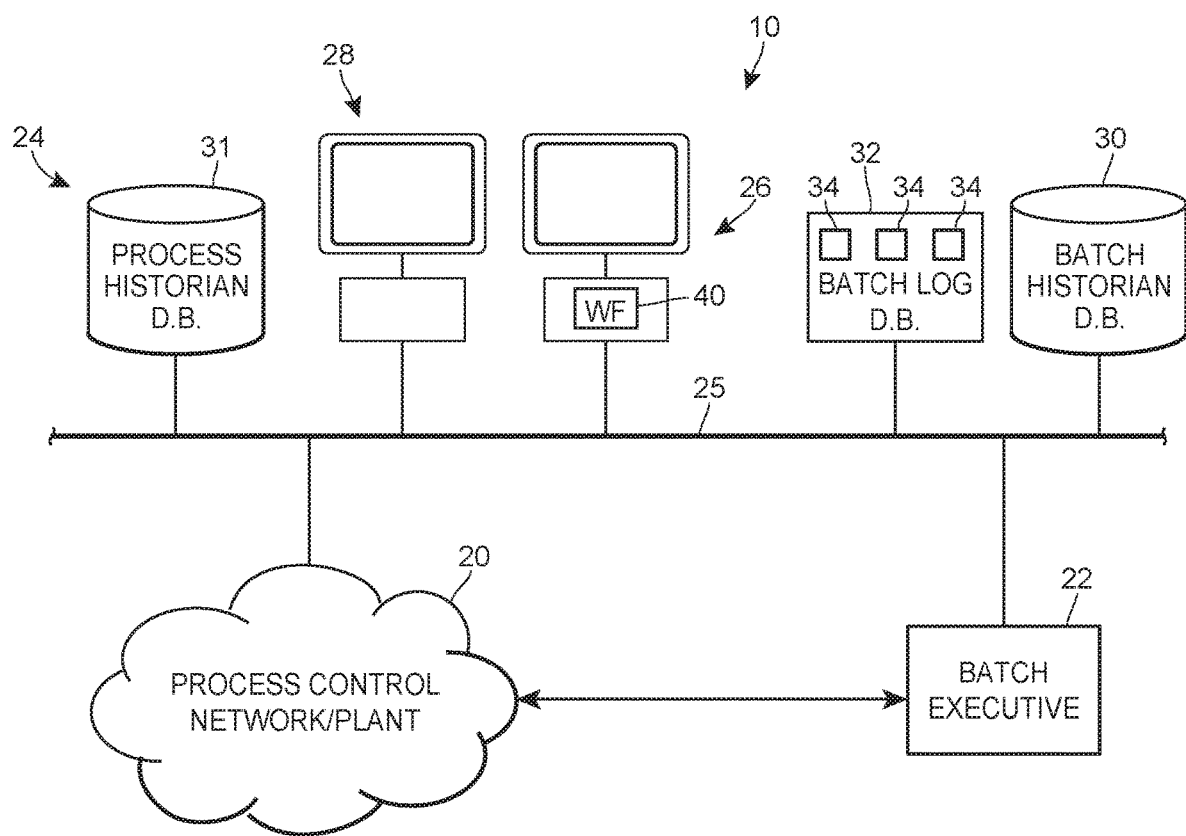
FIG. 1 is a block diagram of a typical process or manufacturing plant including a process control network, a batch executive, and a work flow application that enables an operator to manage a batch process and store a batch log file for quality review.

By way of background, FIG. 1 illustrates a typical plant or process control environment 10 in which typical or existing quality review management actions are implemented. The plant environment 10 includes a process control network 20, which may include various process control devices, such as controllers, field devices (e.g., valves, sensors, transmitters, tanks, mixers, etc.), I/O devices, etc., which are communicatively connected together and are all programmed to operate or implement a manufacturing process of some nature, such as a batch process or a continuous process. Still further, the plant environment 10 may include a batch executive 22 (implemented on a processor of a computing device, such as a workstation or server) that may interface with the process control network 20 to cause the process control network 20 or devices within the process control network 20 to take various actions associated with a manufacturing process, such as implementing various orders or batch runs, including implementing different stages of various batches, such as unit procedures, procedures, operations, phases, steps, etc., of batch processes associated with each order. Still further, both the process control network 20 and the batch executive 22 may be coupled to a further network 24, which may be located in, for example, a business environment away from the plant floor or manufacturing space. The network 24 may include a communications backbone 25 that communicatively connects various devices, such as computer display devices or workstations 26 and 28, various databases 30, 31, and 32 and other computer devices, if so desired, such as gateways to the internet or other communication networks, servers, wireless or handheld devices, etc. (not shown in FIG. 1). The devices 26, 28, 30, 31, and 32 may be communicatively connected via any desired physical communications network or backbone 25, such as an Ethernet network, an Internet or other local area network (LAN) or wide area network (WAN), etc. Likewise, the process control system 20 and the batch executive 22 may be connected to the various devices and databases 26, 28, 30, 31, and 32 via the network backbone 25 directly or via other intervening networks if so desired.

In this prior art system, a workflow application 40 may be stored in an operator interface device (the workstation 26, for example), and the workflow application 40 may be executed by a processor of the workstation 26 to interface with the batch executive 22 as the batch executive 22 is controlling the process control network 20 to implement various orders or batch runs. The workflow application 40, which may be, for example, the Syncade Workflow application sold by Emerson Process Management may operate to obtain and display data from the batch executive 22. This data may include ongoing batch status data, parameter data, measurement data, progress data, batch procedural model state data, etc., as acquired by the batch executive 22. This information or data may include indications of the order being implemented, the materials and processes associated with the order (e.g., the recipe and the batch procedural model to be implemented), alarm and alert data from the batch executive 22 and/or the process control network 20, etc. Any or all of this data may also be stored in a batch log file database 32 as a batch log file 34, as is typical for batch executive routines.

As is generally known, the workflow application 40 may track the operation of the batch executive 22 with respect to each order being implemented by the batch executive 22, and may allow the batch operator to implement various operations or actions within or with respect to the batch executive 22 or the process control network 20. For example, the workflow application 40 may subscribe to certain types of data from the batch executive 22, such as parameter data, batch state data, batch state change data, batch alarms and/or alerts, etc., and may notify the operator of various conditions in the plant 10 based on this data. The workflow application 40 may, for example, notify the operator of the starting and stopping of various different batch procedures or of batch procedural model state changes, may notify the operator of various stoppages or other operational conditions of the batch executive engine 22 (which may be caused by unforeseen problems such as missing equipment, missing raw materials), may notify the operator of time periods being out of place, batch parameters that may be out of range based on what the batch executive 22 is expecting, etc. The workflow application 40, as is known, may allow the operator to take various actions to restart a batch run, to select different equipment for a batch run, to operate on different raw materials, to instruct the batch executive to start up, shut down, or skip procedures, or to execute other procedures in the batch procedural model. As an example, the batch executive 22 may try to go through a cleaning procedure wherein the equipment to be cleaned is off-line and thus unavailable to be cleaned. In this case, the operator may skip the cleaning procedure, which may not be in strict compliance with the quality standards being implemented, but which may be necessary to complete the batch in a timely manner or within an allotted time frame. In any event, the workflow application 40 may enable the operator to annotate various actions taken by the operator. Moreover, the workflow application 40 may store the annotations or notes provided by the operator via the workflow application 40 (e.g., notes or comments provided by the operator to explain what happened and why the operator took certain actions outside of the expected work flow of the batch process), and may store data indicative of various actions taken by the operator via the workflow application 40 in the batch log file database 30 as part of a batch log file 34 for the order being monitored or controlled. Each batch log file 34 typically lists the various data that is obtained from the batch executive 22, along with actions taken by the operator in response to that data, notes put into the log file by the operator, etc. Moreover, during operation of the batch executive 22, the batch executive 22 sends data packets to the workflow application 40 with current data pertaining to a batch run or order. The workflow application 40 may subscribe to various data from the batch executive 22 (or the process control network 20) and may receive this data periodically, when changes in the data occurs, etc. Moreover, each set of data may have a unique packet identifier that identifies various information about the batch run or order associated with the data. In this manner, the workflow application 40 can process the data packets to determine the order and thus the proper operator to whom to provide the data.

As is known, a batch log file or batch report 34 for a batch run is generated during the batch run and, after the batch run or order is complete, the batch log file 34 is complete. At that time, a quality review engineer or other personnel may access the batch log file 34 via some viewing application executed on the computer or workstation 28, for example, to analyze the batch report and to view the data and other information within a batch report on a line-by-line basis. The quality engineer may view this data, as it was stored during the operation of the batch process, in order to determine if any exceptions occurred within the batch run, if these exceptions need to be addressed, and what if any actions need to be taken based on the existence of these exceptions. As noted above, this review tends to take a lot of time, is manually intensive, and requires a lot of knowledge on the part of the quality engineer. Still further, much of the time that the quality engineer spends is simply looking at data or information from the batch report that is not associated with any particular exception or deviation from expected actions within the batch run, and thus this review is time intensive. Still further, as noted above, when a quality engineer identifies an exception based on the data in the batch log file 34, the quality engineer may need to obtain other information about the batch process (e.g., process variable values, batch procedural model states, recipe information, etc.) stored in one of the other databases, such as in a batch historian 30, a process control historian 31, etc. This activity may require the quality engineer to use other data access applications to access that data and thus requires the engineer to have the know-how to access and view that data efficiently and correctly using these other data access applications.

Figure 2:
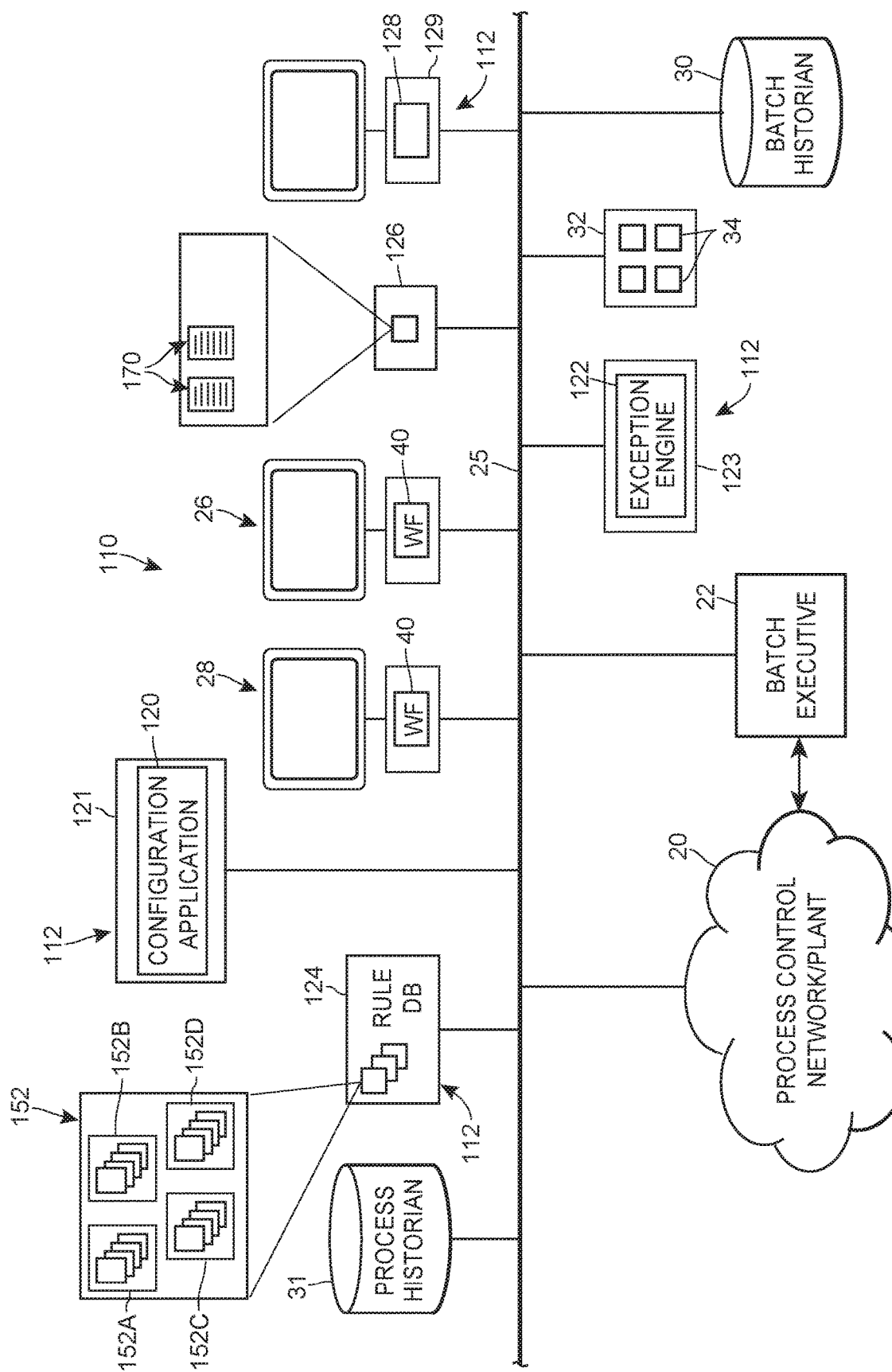
FIG. 2 is a block diagram of a plant environment similar to FIG. 1 but including a quality review management system having a configuration application, an exception engine, and a quality review interface application for use in performing exception based detection and quality review within a plant environment.

FIG. 2 illustrates a plant environment 110 that is similar to the plant environment 10 of FIG. 1 with like structure, applications, and data having common reference numbers. However, the plant environment 110 of FIG. 2 includes a quality review management system 112 that executes to assist quality engineers (or other personnel) in identifying and reviewing exceptions associated with an order or batch run (or with multiple different orders or batch runs), and in some cases, which assists operators in performing work flow operations within a batch run in a manner that reduces the number of exceptions or exception records generated during the order.

In particular, the plant environment 110 of FIG. 2 includes a process control network 20 and a batch executive engine or batch executive 22, which operate in a manner similar to that described above with respect to FIG. 1. Thus, data from the batch executive engine 22 and/or the process control network 20 is provided to various devices via a communications network backbone 25 to which various process control and various different quality review management system 112 computers or devices are connected. In this example, the batch or other process data is provided to a workflow operator interface 26 which executes a workflow application 40 and which provides data to a batch log file database 32 which stores batch log files 34. However, the quality review management system 112 within the plant environment 110 of FIG. 2 includes various applications and databases that are located in, stored in, and executed on computer or processor devices within the plant environment 110. In particular, as illustrated in FIG. 2, the quality review management system 112 includes a configuration application 120 stored in a memory of and executed on a processor of a processing device 121, an exception engine 122 stored in a memory of and executed on a processor of a server 123, a rules database 124, an exception record database 126, and a quality review interface application 128 stored in a memory of and executed on a processing device, such as a workstation 129. While the components 120, 122, 124, 126, and 128 are illustrated as being stored in and executed in separate computing devices different then the computing devices 26, 28, 30, 31, and 32, of FIG. 2, any subset or are all of the components 120, 122, 124, 126, and 128 could be stored in and executed in the same processing devices, which may be the same processing devices that store and execute other process control applications and databases, such as the devices 26, 28, 30, 31, and 32.

Generally speaking, the configuration application 120 may be operated or executed to enable a user, such as a configuration engineer, a quality management engineer, etc., to create and store a set of rules (generally referred to herein as exception rules) which may be used by the exception engine 122 to detect exceptions in the running of a process, such as in a batch run of a batch process associated with a particular order. The configuration application 120 essentially provides a configuration environment that enables a user to create configurable exception rules to execute in the exception engine 122 to define or detect exceptions. The configuration application 120 may store a set of rule templates that may process various types of input data to detect an exception using any desired type of logic or logical expressions, such as Boolean logic. In the configuration environment, a user may select one of the rule templates, may define data inputs/outputs for a rule, and may define a possible expression to be analyzed for a set of data. When the data flows through the exception engine 122, the exception engine analyzes the data against the configured rules to determine if an exception exists. Upon detection of an exception the exception engine 122 then stores an exception record in the database 126.

Figure 3:
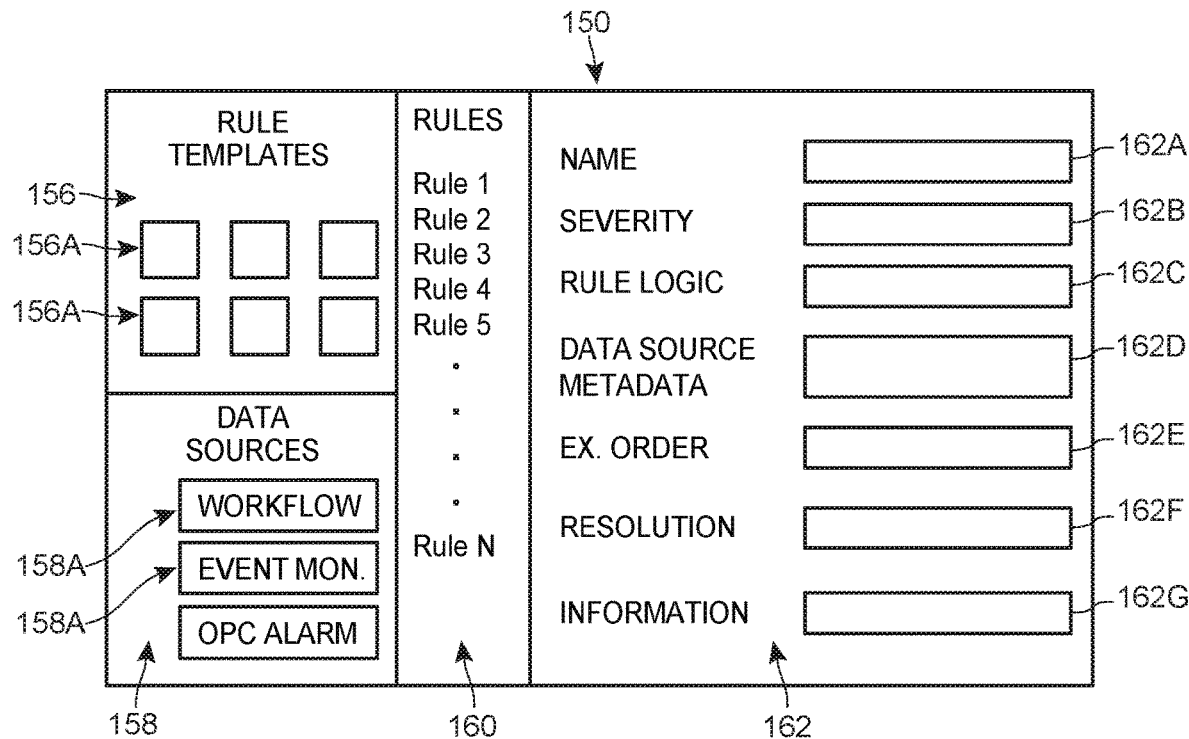
FIG. 3 is an exemplary screen display created by the configuration application of the quality review management system of FIG. 2 to enable a user to create one or more exception rules for use by an exception engine.

As an example, FIG. 3 illustrates a screen display 150 that the configuration application 120 may create and provide to a user (e.g., a configuration engineer, a quality review engineer, etc.) via the workstation 28 of FIG. 2, for example, to enable the user to create one or more exception rules 152 and to store the exception rules 152 in the exception rules data base 124. In particular, the configuration application 120 may enable the user to create different sets of rules to be applied to data from different data sources. As illustrated in FIG. 2, the exception rules 152 may include a different set of exception rules 152A, 152B, 152C, 152D, etc. for each of a number of different data sources. For example, the rules 152A may be created for and associated with analyzing data from the workflow application 40, the rules 152B may be created for and associated with analyzing data from an event monitor application, the rules 152C may be created for and associated with analyzing data from a third party application that performs other services in the plant environment 110, etc. Of course, any number of exception rules 152 can be created and stored for each data source and these rules may be configured in any number of different manners to analyze data from those data sources. For example, different sets of exception rules may be created for different types of runs from a single data source (e.g., batches creating different products) and different sets of exception rules may be created for different quality standards. Likewise, the exception rules associated with a particular data source may be ordered to specify which of the set of exception rules should be executed or analyzed first, second, third, etc.

Referring again to FIG. 3, the configuration application 120 may create a screen that includes a number of different sections including a rule template section 156, a data source section 158, a rules list section 160, and a rule configuration section 162. The rules template section 156 may include a set of icons indicating exception rule templates or previously configured exception rules stored as templates, which a user may use as a starting point for creating a new rule. These templates may be stored in the rules database 124 or in the same device as the configuration application 120 or in any other database or computer memory. The data source section 158 may include icons indicating various different data sources for which a user may create exception rules. The icons 158A may be accessible to view specifics about the data sources, such as data available from the data sources, data or communication formats used by the data sources to communicate data, information about the data sources (e.g., manufacturer, version, etc.), and/or any other information. The rules list section 160 may store a list of rules for a particular selected data source and specify the execution order of the rules when analyzing data from the data source.

During operation, a user may select a data source 158A from the data source section 158 to specify the data source for which a rule is to be created. The application 120 may access the rules database 124 and find the previously stored rules (if any) for that data source and list these rules in the rule list section 160 in execution order, for example. Next the user may create a new rule for the data source by selecting a template data source icon 156A from the template section 156 and dragging and dropping that template icon 156A onto the rule configuration section 162, which will cause the application 120 to load configuration data for the selected template rule into various portions or fields of the configuration section 162. If desired, the rule configuration section 162 may have the fields thereof blank to enable a user to create a new rule without the use of a template. Still further, the user may select one of the rules in the rules list section 160 to edit a previously created rule. Of course, the application 120 may use other manners of selecting or establishing rules to be created (e.g., using drop down menus, pop-up screens, etc.)

The configuration application 120 then enables a user, such as a configuration engineer, to specify, set up, or create the specifics of the rule by providing or editing various rule configuration information in various fields of the rule configuration section 162. Basically, the application 120 enables the user to specify any rule configuration information needed to process data from the data source for the purpose of detecting and handling an exception within the operation of the process monitored by the data source. Generally, each rule stores logic, such as Boolean logic, to use to analyze the data from the data source to detect an exception, information on how to store an exception record and, if desired, information on how to enable a quality engineer to process or resolve (e.g., close) an exception record created by application of the rule. Such exception rules may include, for example, detecting whether one or more parameters from the data source (e.g., the workflow application 40, the batch executive 22, the process control system 20, etc.) are out of range or are above or below certain pre-established thresholds; whether a note has been entered by an operator (e.g., via the workflow application 40); whether different material is being used in a batch run for an order; whether different equipment is being used for one or more batch procedures of an order; whether the processing times of one or more batch procedures has taken longer or shorter than expected; the skipping or addition of certain steps or procedures within a batch run for an order, such as a cleaning procedure or a rinsing procedure; whether an operator or other user of the process system has taken an unexpected action in the process or has entered a note in the data source application, etc. Of course, the exception rules may specify and desired logic to be applied to particular data from a data source to determine if an exception exists.

Thus, as illustrated in the example screen 150 of FIG. 3, the rule configuration section 162 includes a name field 162A which may be used to specify a name of the exception rule, a severity field 162B which may be used to specify a level of severity or importance of the exception detected by the rule, and a logic field 162C which may be filled out or used to specify logic to be applied by the exception engine 122 (FIG. 2) to detect if an exception exists. Of course, the logic field 162C may accept or enable the user to enter or specify logic in any desired manner, such as a set of Boolean logic parameters or strings, coding in a particular language (C+, HTML, etc.), any desired custom expression syntax, etc., that applies some logic, If-Then logic statements, etc. Still further, a source parameter field may be used to specify any and all data that is needed from the data source for application of the logic rule or logic as provided in the field 162C. This data source data, which is referred to herein as data source metadata or just metadata, specifies all of the data associated with the information, format, and communication parameters of data to be received from the data source for the rule. The configuration application 120 may enable the user to select one of the icons 158A to obtain configuration information for the particular data source for which a rule is being created to determine what data source metadata (information and/or variables) is available from the data source, the names of these variables, the data formats of these variables (e.g., 32 bit, 64 bit, variable types, such as integer or Boolean, or string variables), etc. Still further, the field 162D may enable the user to specify a conversion to be performed on a metadata from a data source prior to the input data from the data source being used in the logic specified in the field 162C. Such conversions may be mathematical operators (changing from Celsius to Fahrenheit, scaling, limits, etc.), the conversions may be variable name changes (to match the various variable names used in the logic to the data source variable name), or these conversions may be any other types of conversions. Moreover, the metadata from a data source may include any desired information, such as process parameter values, an order name, materials for the order, process flows for the order, process equipment to be used in the order, work flows to be applied to the order, the batch procedural model used in the order, etc.

Still further, the configuration engineer may use the configuration application 120 to specify the order or sequence in which each of the rules of a particular set of rules should be applied to any particular set of data from a data source. In particular, the exception engine 122 may apply multiple rules to each set of data from a data source and may be set up to apply each of the multiple rules in a specific or predetermined order so as to detect certain types of exceptions (typically more important or severe exceptions) prior to other types of exceptions (e.g., less severe exceptions). For example, in many instances, the application of different exception rules to a particular set of data from a data source may result in the detection of multiple different exceptions. However, it may be important or desirable to determine only the most significant exception for any particular data set from a data source to prevent the creation of multiple exception records associated with the same event or time in a batch run or order. The order of the rules (i.e., the order in which the exception engine 122 applies the exception rules to a particular set of data) is thus used to specify which exceptions are detected first so that, during operation, the exception engine 122 determines the exceptions based on the various rules by running the rules in a particular order, and then saving or creating an exception record for only the first detected exception. As indicated above, the rules section 160 may store the list of rules for the source in the order that these rules will be executed. Each rule may, as a parameter thereof, store or include a sequence number or order number indicating this execution order. In any event, the user may change the order of the rules for a data source by, for example, rearranging the order of the rules in the list of rules in the section 160. The user may, for example, select a rule in the rule list 160, drag that rule up or down in the list 160 and drop the rule in a new location in the list 160 to change the execution order of the rules. Of course, the application 120 may enable the user to change the order of rules in other manners, such as changing an order field 162E in the screen section 162.

Still further, if desired, the screen section 162 may include a resolution field 162F which may enable the configuration engineer to specify one or possibly more handling or resolution procedures that should or must be applied to close an exception record created by the rule. Generally, each type of exception may support a single resolution procedure. However, in some cases, exceptions may support or include multiple resolution procedures. Such resolution procedures may include signing off on the exception, annotating the exception record with various information, sending the exception record to other personnel to review and/or sign off on, etc. In some cases, each resolution may simply be a definition of a set of signatures needed to close the exception, or the resolution may simply enforce one or more signatures needed to close the exception. In these cases, the resolution may include a description of or a set of instructions that indicate other activities (procedures) to be completed prior to the signature(s), but in these cases, the resolution may not monitor or enforce the other activities. The handling procedures as specified in the rule may be preset or may be set to default settings based on, for example, the severity of the exception as specified in the field 162B.

Still further, the screen section 162 may include an information field 162G that accepts and stores information to be provided to the quality review engineer along with or as part of the exception record created by application of the rule. This information may be general information about this type of exception, normal handling procedures, directions or suggestions as to other actions to take or consider, or any other information that may be useful to the quality review engineer when viewing or handling the exception record created by application of the rule. In many cases, the field 162G may also be used to specify data source metadata to be stored as part of the exception record, as well as the format of displaying this metadata. Generally, when processing an exception record, it is helpful for the quality review engineer to know the context of the process at the time of the exception, and the data source metadata may be provided as information to help the quality review engineer to understand this context. As such, the configuration field 162G may indicate what data source metadata is to be provided to the quality review engineer as part of the exception record.

Of course, the configuration application 120 may store any or all of the rule configuration information as part of the exception rule in the rule database 124 in any desired manner. As will be understood, this configuration information may include the identity of data that is needed from a data source and this data can be used, as will be later described, to obtain the correct data or information from a data source during operation of the data source.

Of course, the configuration application 120 may be used to create any number of exception rules, and the exception rules may be stored in the rules database 124 on a data source by data source manner, so that different rules or sets of rules may be made and stored for different data sources (or for different orders associated with a single data source). In any event, the configuration application 120 may be used to create rules and may do so by enabling a user to create a new rule (e.g., from a template rule), may enable the user to specify a name for the rule or exception to be detected by the rule, logic to be applied to data from a particular data source to be implemented to detect the presence of an exception or a deviation from a norm based on the data, an identification of a type of rule or exception which the rule detects, a set of information to be provided to a reviewer or other user upon the rule detecting an exception (such as an explanation of the exception, data or instructions useful for analyzing or signing off on the exception), an identification of a severity (e.g., importance) of the exception detected by the rule, metadata (e.g., data from the data source) pertaining to the state of the process (e.g., batch run) at the time of the exception that should be stored as part of the exception record, processes or procedures that may be used or must be used to deal with or resolve the exception (e.g., sign-off procedures), and other data or information to be stored as part of an exception record or to be used in processing of an exception record.

Importantly, this configuration system or configuration application 120 provides a significant advantage over known products, which require the exception software provider to hard code the exceptions defined for the system into the product, and thus require a software or system update to create new exceptions. These updates take time for the user to get and install, and do not enable users to customize their own systems.

After a set of exception rules is created for one or more data sources, and these rules are stored in the rules database 124, for example, the quality review management system 112 may thereafter implement the exception engine 122 in real time during operation of a data source to detect exceptions that may occur as a result of the operation of the underlying process being monitored, controlled, or effected by the data source application. When set up to run or execute on data from a particular data source, the exception engine 122 periodically or intermittently receives sets of data (e.g., metadata) from the data source indicating various operational parameters of the process and/or application that monitors or controls the process. For each set of data, the exception engine 122 obtains and applies the logic of the exception rules created for the data source to thereby detect exceptions in the process being implemented, managed, or monitored by the data source. When interfacing with or communicating with the data source, the exception engine 122 may receive sets of data from the data source periodically, when some particular action or actions occur in the process or data source, and/or at other configured times. The exception engine 122 may subscribe to such data based on the data source configuration data within each of the exception rules for the data source, may poll the data source for such data at various times or may implement a combination of these communication techniques. In this manner, as the data source, such as the workflow application 40, operates to receive new data and to interface with an operator (e.g., to assist the operator in analyzing batch data from the batch executive 22 for example), the workflow application 40 also sends data (periodically or otherwise) to the exception engine 122, which then analyzes the data using the exception rules for the workflow data source application 40 to determine if one or more exceptions have occurred in the underlying process.

During this process, the exception engine 122, which is a logic engine, parses the data sent from the data source and applies the logic within the appropriate set of rules, such as the rules 156A in the database 124, to thereby analyze the data according to the rules to detect one or more exceptions. The exception engine 122 may apply the rules to the data one by one in the order specified in the set of rules as stored in the rules database 124, and may detect any exceptions as determined by the rules or may stop processing the data when an exception is detected by any of the rules on a particular set of data. Upon detecting an exception, the exception engine 122 creates an exception record for that set of data and stores the exception record in an exception record file 170 (FIG. 2) within the database 126. Of course, as each new set of data is provided by the workflow application 40 (or other data source) to the exception engine 122, the exception engine 122 processes that data for exceptions and determines if any exceptions exist, and then creates and stores exception records in exception record files 170 as appropriate. The exception engine 122 may store various different kinds of data associated with an exception record including, for example, a name of the exception identified or detected, a severity of the exception, review or resolution procedures to be applied, notes entered by the operator as part of the data sent from the data source, general information about the exception, etc. Still further, the exception engine 122 may provide, as part of an exception record, metadata that in some manner defines or is related to the operation of the batch or other process equipment at the time of the exception. This metadata may be provided to the exception engine 122 as part of the data from the data source, or may be obtained by the exception engine 122 from the data source (e.g., the workflow application 40), or from a database or other source of that data separately from the data source. The metadata stored in the exception record may be any data that defines some operational parameter, value, state, or other information associated with the process being implemented at the time for which the exception is detected. This metadata may be, for example, batch state information, process parameter values as measured or determined from the process, process equipment information, alarm or alert information from the process equipment, or any other information. Moreover, this metadata may be obtained from other sources, such as batch log files 34, process control databases or historians 31, process equipment, batch historians 30, etc. or may be provided directly from the data source itself, as part of the initial data processed by the exception engine 122 or in response to a query by the exception engine 122. Generally speaking, the stored metadata provides a snapshot of the process (e.g., process state information, process equipment information, process variable values, batch procedural model states, etc.) at the time that the exception was detected. This metadata may be displayed as part of the exception record to enable a quality engineer to understand the context of the exception (e.g., what was happening in the process at the time of the exception) to thereby better understand the exception and the importance of the exception.

As will be understood, the exception engine 122 operates in real time, that is, in an ongoing manner in tandem to the data source, to analyze the data from the data source for exceptions and to store exception records for detected exceptions in an exception database 170. The exception engine 122 may operate to receive new sets of data packets from the data source, such as a workflow engine 40, for any period of time. For example, the exception engine 122 may analyze data from the workflow application 40 as a particular batch process is run and may halt upon completion of the batch process or order. Of course, the exception engine 122 may operate to analyze and detect exceptions for multiple different batch runs simultaneously, for example, from the same data source (e.g., the workflow application 40), and/or may analyze data from different data sources simultaneously. In all of these cases, the exception engine 122 may create and store exception records for each different batch run of a single data source and/or for each different data source simultaneously. Thus, the exception engine 122 may understand that different batch runs are occurring at the same time or that data from different sources are being processed over the same time period, and may track these runs and processes separately to create different exception databases 170 for each batch run, order, and/or data source.

Figure 4:
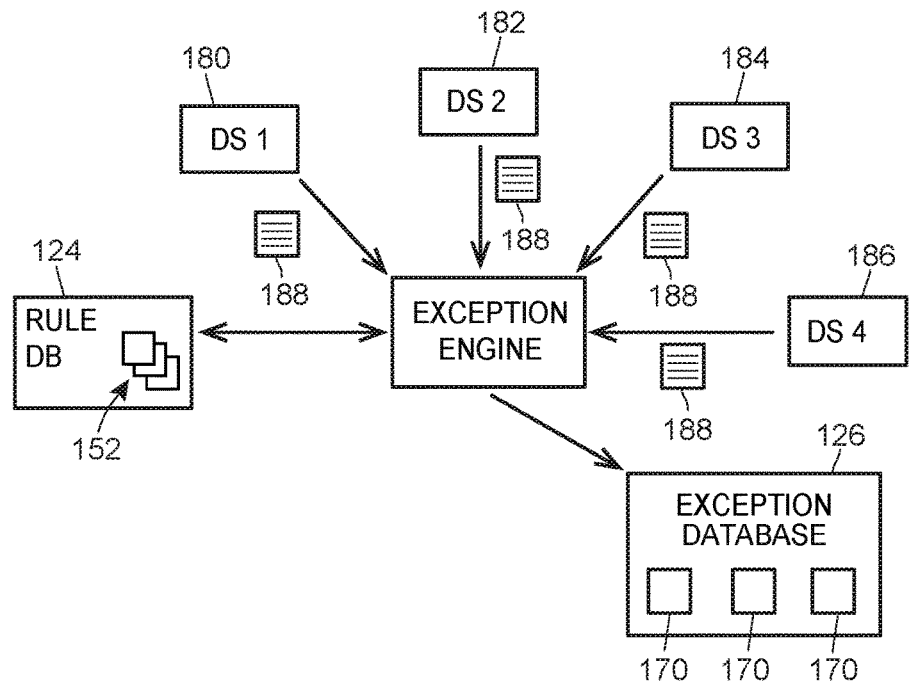
FIG. 4 is a flow chart illustrating the operation of the exception engine of the quality review management system of FIG. 2 when analyzing data from multiple data sources for exception processing.

FIG. 4 illustrates the operation of the exception engine 122 on multiple different data sources 180, 182, 184, and 186. The data sources 180-186 may be the same types of data sources (e.g., different instances of workflow applications 40 running different batches or making different products), and/or may be different types of data sources, such as event monitoring applications or systems, third party proprietary systems or applications, etc. In this case, the exception engine 122 and/or the data sources 180-186 are configured to periodically receive and send data packets 188 with data source metadata to the exception engine 122. These data packets 188 may be formatted to include data from the data source as specified by the metadata configuration information within the rules for the data source and these data packets 188 may include an identifier of the data source, the order being implemented by the data source, the data source metadata, etc.

The exception engine 122 receives and processes each of the data packets 188 from different data sources 180, 182, 184, and 186, in turn as these packets are received. For each packet 188, the exception engine 122 may determine the identity of the data source and order (as specified by data within the data packet 188), may obtain the appropriate set of rules from the rules database 124 for that data source, and may apply the obtained rules in a predefined order to the data within the data packet 188 to determine if an exception exists. If the exception engine 122 processes through all of the rules for a data source without detecting an exception, the exception engine 122 then waits for or begins to process the next data packet 188 (from the same or a different data source). If, on the other hand, the exception engine 122 detects an exception based on the application of the rule logic to the data source metadata, the exception engine 122 creates an exception record 180 for the order and stores that exception record in an exception record database 126 as an exception record file or database 170 for an order. That is, all exception records for a particular order may be stored as a set of exception records for that order. In any event, as indicted by the diagram of FIG. 4, the exception engine 122 may operate simultaneously on data from various different data sources and/or for various different orders (from the same or different data sources) to produce exception databases for each order.

One additional benefit of the exception engine 122 is that it operates in real time, i.e., during operation of the underlying process, and so can detect the occurrence of an exception in real time, e.g., as the exception occurs. As a result, one feature of the exception engine 122 is that, upon detecting the occurrence of an exception, the exception engine 122 can immediately or in real time notify the operator or some other personnel at or associated with the data source of the existence of the exception, which may enable the operator or other person to take actions within the process to mitigate or avoid the exception. In some cases, exception rules may be configured to detect the possible occurrence of a future exception based on actions or states of the current process. In this case, the exception engine 122 may detect the possible or likely occurrence of an exception and may notify the operator or other user, in real time, that an exception is likely to occur. This notification provides the operator or other user an ability to reverse some action or change some parameter that is at the root cause of the future exception, before the exception occurs. This live feedback can therefore be used to avoid or immediately mitigate exceptions by enabling the operator or other process monitoring or control personnel to take actions to avoid or reverse the conditions leading to the exception.

Figure 5:
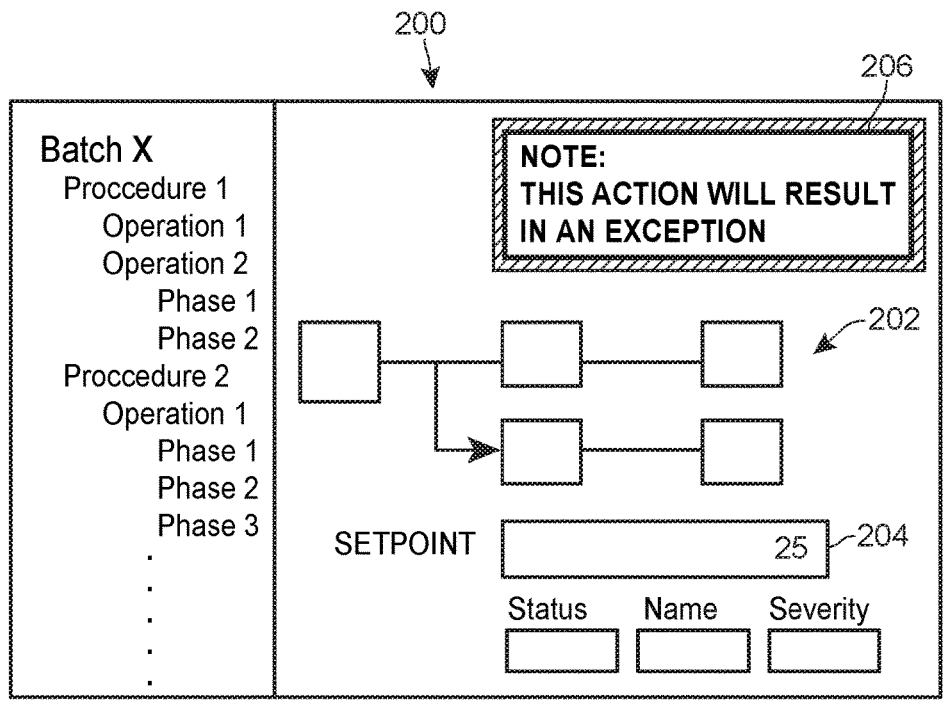
FIG. 5 is an example screen display illustrating live feedback from the quality review management system to an operator of a batch process informing the operator of the detection of an actual or potential exception within the process in real time.

FIG. 5 illustrates a screen display 200 that may be provided by, for example, the workflow application 40 of FIG. 2 to an operator as part of normal operation of the workflow application 40. In this case, the display 200 may provide process information in the form of a process or work flow diagram 202 to the operator and may enable the operator to take some action or actions in the process via input fields 204. In this case, the operator may change a setpoint of a particular process parameter using the input field 204 in the screen 200. However, as the operator enters a new setpoint, or immediately after doing so, the workflow application 40 sends a data packet to the exception engine 122 with data indicating this change. In this example, the exception engine 122 may be programmed to implement a rule to determine if the value of the process parameter is within a particular range (as this process parameter may be a critical process parameter for quality purposes). The exception engine 122, upon running the rule, may detect that the critical parameter is being set out of the desired range and will thus result in an exception if the setpoint is changed. The exception engine 122 may then immediately send a notification via a live feedback message to the application 40, which may result in a notice or alarm being provided to the operator. For example, as illustrated in FIG. 5, a pop-up box 206 may be created in the screen 200 based on the live feedback message, telling the operator that the contemplated action or the just taken action will (or did) result in the creation of an exception record. This message in the pop-up box 206 may instruct the operator to take an action to avoid or to mitigate the exception (if it already occurred). Thus, as will be understood, rules as created and stored in the rules database 124 for a data source may pertain to detecting actual exceptions and/or to detecting the likely occurrence of a condition leading to an exception in the future. Moreover, the live feedback feature of the exception engine 122 may be used to enable a user to avoid the occurrence of an exception in the future or to mitigate or reverse the conditions leading to a currently detected exception. Because this notice is in real time to the operation of the process, it is much more likely that the effect of the exception can be reversed or mitigated using this live quality feedback technique.

Figure 6:
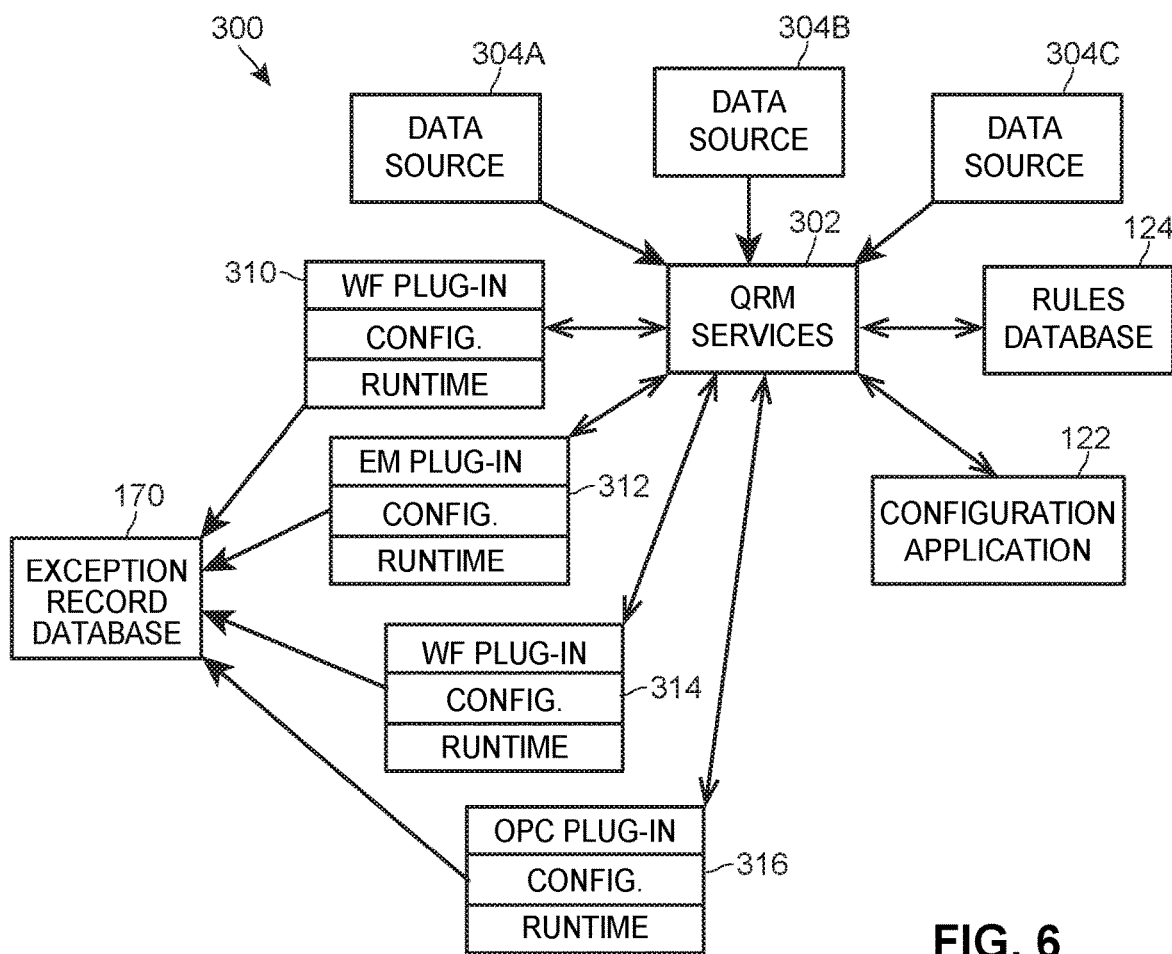
FIG. 6 is a diagram illustrating the operation of a quality review management system implemented in a plug-in environment.

While FIG. 2 illustrates the operation of a quality review management system 112 in a process plant environment 110 in which various portions of the system 112 are executed in dedicated servers and databases, the quality review management system 112 may be implemented in a plug-in environment, making the system much more portable, able to be more easily used on mobile or distributed devices, easy to maintain and implement in a distributed environment, and easily configured for use with third party systems or applications. In particular, FIG. 6 illustrates the quality review management (QRM) system 300 implemented using plug-ins. The quality review management system 300 of FIG. 6 includes a quality review services device 302 (which may be stored in and executed on a server or other computing device) that is communicatively coupled to various data sources 304A, 304B, 304C, etc., a rules database 124 and a configuration application 122. Still further, the quality review management services device 302 is coupled to various plug-ins 310, 312, 314, 316, etc., which may be stored in and run in any desired computing device, such as in workstations within or outside of the plant environment, in mobile devices, such as in laptops, phones, etc., or in any other device. The plug-ins 312-314 may be created (instantiated and spun off) as needed for any particular order or data source. In this case, each plug-in 310-316 may be created for a particular data source and/or for a particular order within a data source to analyze the data from that data source for exception detection. Plug-ins may be destroyed when the order or application is complete or finished.

Generally speaking, the QRM services device 302 may, in response to a configuration application 120, create a particular plug-in for a particular data source or a particular order from a particular data source. Each plug-in 310-316 may include configuration information provided as part of the configuration of the plug-in 310-316 to inform the plug-in 310-316 of the data and data format of information that will be sent to the plug-in 310-316 for evaluation, the location at which to store an exception record file or database for the data source or order, and any other desired configuration data needed for operation of the plug-in 310-316. Moreover, if desired, the configuration data for the plug-in 310-316 may include one more rules to apply or analyze based on received data. Of course, each plug-in 310-316 can be associated with (configured for) the same data source or for different data sources and so the configuration information for each plug-in 310-316 can be similar or vastly different depending on the data source or use of the plug-in 310-316. The configuration information of each plug-in 310-316 may also specify the data to be subscribed to or to be received from the QRM services device 302 or from a third party application or source during operation, and the plug-ins 310-316 may register with the QRM services device 302 or other applications or sources to receive that data. Generally, the plug-ins 310-316 may operate simply to obtain specific data from a data source and so need only to be configured to understand what data is coming from the data source, and the format of that data. The plug-ins 310-316 can then receive and process the data from the data source and put the received data in a format for use by the exception rules as created for the data source. In this manner, the plug-ins 310-316 may operate as data gathering and interpretation applications for any types of data sources, even third party or proprietary data sources.

Moreover, each plug-in 310-316 may include a runtime processing configuration that defines or controls the operation of the plug-in 310-316 during operation. This runtime section may include a logic parser that uses rules or logic within the exception rules for a data source to analyze received data from a data source and to create and store exception records in an exception record database or log 170. In essence, the runtime section of a plug-ins 310-316 implements the exception engine 122 of FIG. 2 on an instance by instance basis. Thus, as noted above, the plug-in modules 310-316 may be created to interface the exception engine 122 with external or third-party systems (e.g., control systems, OPC interfaces, maintenance systems, etc.); thereby enabling exceptions to be generated based wholly or in part based on data from third party or external software systems. In one example, plug-ins are created to access particular data within or from a third party or external system and to pass this data to the exception engine 122 to analyze whether an exception should be created or not. However, the plug-ins 310-316 may be stored in and executed in a third-party server, in the QRM services device 302, or in another server, mobile device, or other processing device.

As an example, the configuration application 122 of FIG. 6 may be used to create one or more plug-ins 310-316, including specifying the format of data to be received from the data source to be analyzed by the plug-in 310-316, how often the plug-in 310-316 should receive data from the data source, the identity of an order and other information about the data source, the type of application to which the plug-in 310-316 will be used to process, etc.

Moreover, the plug-in modules 310-316 may be created with data acquisition functionality and with runtime exception processing capabilities if so desired. Once created, the plug-ins 310-316 may be stored in and executed in any convenient location or processing device, such as a device close to the data source or data sources. Moreover, the plug-ins 310-316 may register with the data services device 302 (or with any other server or device) to receive data from the appropriate data source, such as one of the data sources 304. The QRM services device 302 may then subscribe to or poll the data sources 304 for the appropriate data, and upon receiving a data packet from a data source, may provide the data and one or more exception rules for the data source to the plug-in module 310-316 to be used to analyze that data. The plug-in 310-316 may then use the rule or rules in the logic engine thereof to analyze the data for exceptions, and upon detecting an exception, may store an exception record in an exception record database 170 for the data source. Thus, as will be understood, the QRM services device 302 acts as a data broker for the plug-ins 310-316, which can operate independently of one another on any desired device using any data or data obtained from different sources.

As will be understood, the quality review management system 128 may implement the use of plug-ins or plug-in modules on a source-by-source basis to execute the functionality of exception engine, as described herein, to enable the quality review management system to be easily configurable for different data sources, for different quality review standards, and/or to be easily run in a distributed environment in which various different parts of the system are executed in different computers spread throughout a plant. In this case, a different plug-in can be created for each various type of data source, and each plug-in can have its own set of rules associated therewith to be used to perform exception detection from a particular data source.

Moreover, the plug-in modules 310-316 may or may not perform exception processing and detection in a batch or order processing environment. In some cases, for example, one or more of the plug-ins 310-316 may be created to perform or enhance process or event monitoring within a plant, or to perform quality review within a plant, such as within a continuous process manufacturing plant. Thus, the plug-ins 310-316 may be simple third-party system data gatherers, or may gather data and additionally perform some exception processing, or may provide an exception or pre-processed exception data to a stand-alone exception engine. The use of plug-ins to implement quality review is advantageous because known quality review products are unable to interface with or create exceptions based on data provided directly from external software programs, like control systems, safety systems, maintenance systems, etc. Moreover, the use of a plug-in module environment makes the quality review management system 112 described herein much more robust in a complicated process environment having multiple different software systems operating during runtime.

Figure 7:
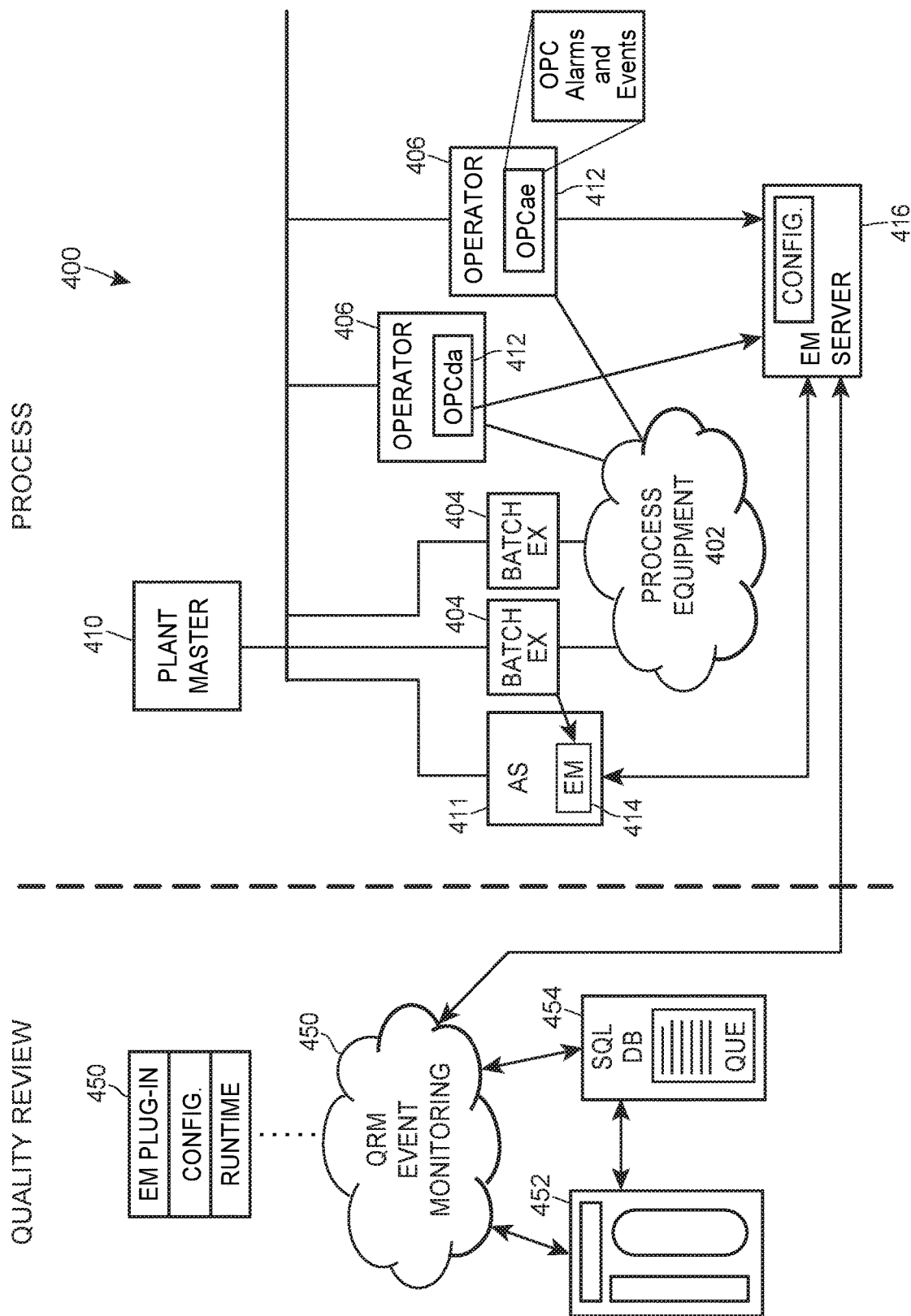
FIG. 7 depicts an example event monitoring system that uses a quality review management system in a continuous process environment to perform monitoring of third party applications and systems.

FIG. 7 illustrates an example of a data or event monitoring system using the quality review exception processing techniques described herein. In particular, FIG. 7 depicts a high level diagram of a process plant 400 that may run continuous processes or process equipment. As illustrated in FIG. 7, the process plant 400 includes process control equipment 402 that may be associated with, for example, running or implementing a continuous process (such as a crude oil refinery process), or a batch process, or both. The process plant 400 may include one or more batch executives 404 connected to the process control equipment 402, and one or more operator interfaces 406 that monitor one or more sections or parts of the process control equipment 402. Still further, the batch executives 404 and operator interfaces 406 may be connected to a master plant control device 410 which may store configuration and control information for the plant 400. Still further, the plant 400 may include one or more application servers 411 which may run other applications, including for example database applications, monitoring applications, plant analysis applications, etc.

In many cases, the plant assets within the plant 400 run proprietary or third party control, monitoring, and asset management systems that collect a great deal of data from the plant during operation. Moreover, the operator monitoring applications and interfaces 406, the batch executive 404 or other control applications may also be priority in nature. It is known in process control technology to use OPC interfaces to obtain data from various third party or proprietary applications. Thus, each of the operator interfaces 406 may include an OPC alarms and events (OPCae) 412 or an OPC data access (OPCda) interface 412, for example, to enable detection and use of alarm and event data (as generated in the plant 400 such as in the process equipment 402) or other process data to be used by external systems. Additionally, in some cases, one or more monitoring applications 414 may be stored in one or more of the plant devices, such as in the application server 411 or a separate event monitor server 416. The event monitoring applications 414 may be known applications used to interface with one more of the batch executives 404 to obtain process event information (but not necessarily via an OPC interface) and/or may be configured to interface with one or more of the OPCae or OPCda interfaces 412 to obtain alarm and event data or other data from the process control network 402. The event monitor applications 414 are traditionally used to obtain process data, such as event and alarm information, from the plant assets and to store that data in a database for later review or use in various systems, such as process control analytic systems, maintenance systems, etc.

However, the exception processing structure described herein may be used to process alarm and event and other information as obtained from the event monitoring applications 414 to determine if certain plant conditions occur within or during operation of the plant equipment 402. Such conditions may include, as examples only, when certain events or alarms reach a critical level, when a certain set or combination of alarms or events occur together, when various process conditions exist, or any other set of conditions that indicate an issue that may need to be noted to a user of some sort, such as a quality review engineer, a safety engineer, etc. To perform this function, an event monitor plug-in 450 of FIG. 7 may be used to access data from one or more of the event monitoring applications 414 within the plant 400, one or more of the OPCae and/or OPCda interfaces 412 within the plant 400, etc. The event monitoring plug-in 450 may receive data from the event monitoring applications 414, OPCae and OPCda interfaces 412, or other data sources in the plant 400, and may perform exception rule processing to detect the existence of certain, typically more complex conditions in the plant 400. That is, there may be conditions in the plant 400 that a quality review engineer, a safety engineer, a maintenance engineer, a process control engineer, or other person may want to know about but which are not otherwise detected by the process control or monitoring systems as these systems are set up and running the plant 400. Generally, these conditions may not be simply determined by single alarm or event notification generated in the plant 400, but may instead need to be determined by the existence of a more complex set of conditions in the plant 400, such as an alarm over a certain critical level, a certain number of alarms of some type occurring at the same or at approximately the same time, an alarm of a certain type or severity in conjunction with one or more other events in the plant 400, etc. As will be understood, the plug-in module 450 may include or provide access to an exception engine (as otherwise described herein) that operates with rules implementing logic to determine these "exceptions" in the operation of the plant 400. Thus, the event monitor 450 of FIG. 7 may collect data from third party applications (event monitoring applications 414) or systems (event monitor servers 416) or interfaces (OPCae interfaces 412) and may process this data using a set of preconfigured rules to perform enhanced event detection or process monitoring or exception processing for quality review purposes. In this case, the event monitoring application 450 (which may be located in a different environment from the plant environment, as noted by the dotted line of FIG. 7), may provide the results of the rule analyses to a monitoring interface 452 and/or to a database 454, such as an SQL (Sequel) database for later review. In essence, the event monitoring plug-in 450 operates to detect "exceptions" in the operation of the plant equipment 402 based on event monitoring data collected by the plant equipment 402 and provided to third party applications or interfaces in the plant 400. This type of monitoring is still referred to herein as exception processing, as this monitoring detects exceptions in the operation of the plant 400, even if it is not performed as part of a quality review process.

In any event, the event monitor 450 may be tied to any of one or more third party or external systems and may be used to generate and send messages to a rules engine (not shown) which can then use these messages to perform exception processing or exception creation in the form of monitoring messages, notifications, alarms, etc. In one case, the internal event monitor 450 may be tied to or coupled to an OPCae interface 412, and may recognize when one or more alerts or alarms are passed from the OPCae interface 412. At this time, the event monitor application 414 or OPC interface 412 creates and drops a message to the external event monitoring system 450 with the alert or alarm information and potentially any other desired OPC collected data. The system 450 may then analyze the messages to generate exceptions based on the data in the messages. This operation is advantageous because known quality review systems do not analyze data from third party systems, and are not connected to the OPC alert and alarm interfaces that exist. As such, these systems are not able to generate exceptions based on process alarms and alerts, for example.

Generally speaking, the event monitoring system 450 of FIG. 7 can be configured in a number of different manners to collect and process alarm and event data from the process control system 402, to produce an enhanced monitoring system using exception processing. In particular, a user can configure the event monitoring system or module 450, which may be a plug-in as described above; to subscribe to and collect data (e.g., event and alarm data, messages, etc.) as collected by the OPCae and OPCda interfaces 412 of FIG. 7, for example. The event monitoring server 416 which collects this data can then send this data in data packets to the event monitoring application 450 along with other information, such as timing information, process control metadata (obtained from the OPC interfaces 412, the batch executive 404, the process computer 410, etc.). The event monitoring system 450 can then apply a set of rules to the data, as described above, to determine if any event monitoring exceptions exist based on the collected events and alarm data and the rule logic. If an exception is determined, the event monitoring system 450 may create a message (based on the rule) and send that message to the monitoring interface 452 for display to a user and or to a database or message queue 454 in, for example, a Sequel server. The rule that generated the exception can, of course, specify the content of the message, the format of the message, the information to be placed into the message, the interface(s) to which the message is to be sent, etc. Additionally, or instead, the event monitoring system 450 can create and send an exception record to a monitoring database for storage and later retrieval. This exception record (which is a monitoring condition record) may include any desired information based on the rule configuration, and can include, for example, an explanation of the event, the severity of the event, instructions for dealing with the event, process metadata at the time of the event, etc. As will be understood, in this case, the rule logic for the event is processed in the event monitoring system 450 (or in an exception engine coupled thereto) and can be processed in or using a plug-in environment such as that of FIG. 6 or in a traditional server environment such as that of FIG. 2.

In another case, the event monitoring system 450, based on its configuration, can configure the OPC interfaces 412, for example, to detect certain conditions or combinations of conditions and to then send the event monitoring system 450 a message when these conditions are met. In this case, the event monitoring system 450 essentially programs the OPCae or OPCda interfaces 412 to perform the logic of the rule and to only send messages or data to the event monitoring system 450 when that logic is satisfied. Upon receiving a message from the OPCae interface 412 with a message indicating that a particular set of conditions or logic is met, the event monitoring system 450 can simply create and send a communication to the event monitoring interface 452 and the database 454 to notify a user of the condition and to store an exception record in the database 454. In this case, the logic of the rules for the event monitoring system are executed wholly or partially in the OPC interfaces 412 or external event monitoring applications 414, 416, which may be configured using known techniques to implement this logic and only sending messages when certain conditions exist in the process plant 400.

Thus, in the example system of FIG. 7, the exception based processing of the quality review management system described herein may be used to analyze, review, or detect exceptions in data from third-party systems that do not use the same data format as, for example, the workflow application 40. While in the case of FIG. 7, the quality review management system is illustrated as being used as an event monitoring system to interface with batch or continuous process control system via one or more OPC interfaces 412 to determine monitoring based exceptions based on the existence of various events, alarms, parameter settings, etc., the quality review management system described herein could be connected to third party process equipment, servers, applications, etc. via any other desired interfaces.

Referring back to FIG. 2, the quality review interface application 128 may be executed to enable a user, such as a quality review engineer, to access one or more exception record databases 170 for a one or more batch runs, orders, process operations, etc. from a particular data source. The quality review interface application 128 may, for example, enable a user to step through each of the exception records in an exception database 170 one by one to view the detected exceptions and to resolve these exceptions, such taking any necessary actions to close the exception records. The quality review application 128 may present, via an interface screen of an interface device, data or information for each exception record, such as the name of the exception, the type of exception, the severity of the exception, the batch metadata or snapshot information stored for the exception record, notes created and stored by an operator that are associated with or that caused the exception record to be created, any other information provided by the data source, etc. This information enables the quality reviewer to quickly understand the exception and the context of the process (e.g., the batch run) at the time of the occurrence of the exception to be better able to understand the exception and the importance of the exception. The quality review interface application 128 may also present various other types of information to the user in a structured manner, such as general information about this type of exception, what steps need to be performed to handle or sign off on this type or severity of exception, etc. Still further, the quality review interface application 128 may enable the user to take one or more of the various steps needed to sign off on or close the exception, such as implementing one of the various procedures as defined by the original exception rule that detected the exception, in order to sign off on or handle the exception. The quality review application 128 may, for example, enable the user to click a check box on the screen to acknowledge and sign off on the exception, may require or enforce a process that includes having one or more other people view and sign off on the exception in order to close the exception, etc. Still further, the quality review interface application 128 may be able to send the exception record to other people via email or other network communications, in order to obtain a sign off on the exception, to ask questions or provide data or notes about the exception, to determine more information about the exception, or to implement procedures necessary to handle or close the exception.

Figure 8A:
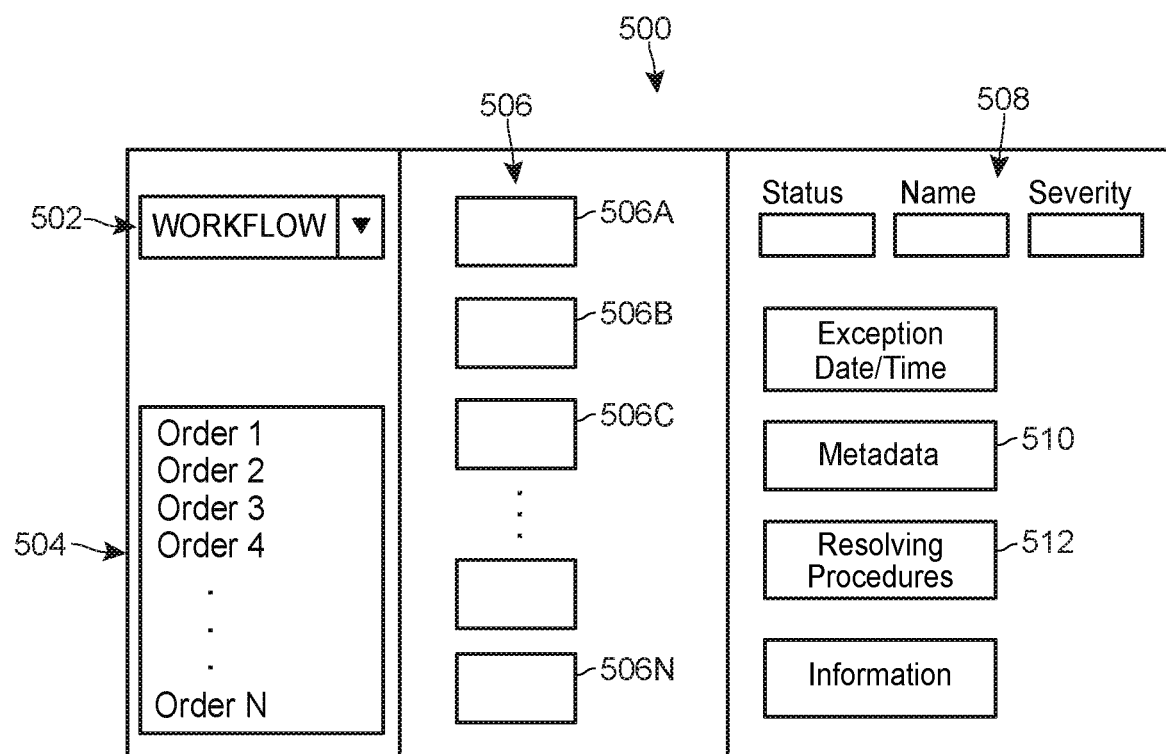

FIGS. 8A-8G depict various example screen displays that may be created by the quality review interface application 128 to enable a reviewer to see and manipulate exception records in the process of performing quality review of, for example, an order. As an example, FIG. 8A depicts a screen display 500 that may be used by a reviewer to select one of a set of various orders or exception record files to review. The screen 500 includes a section or field 502 that lists various data sources (e.g., in a drop down menu format) for which exception record logs 170 exist (as stored in the exception record log database 126 of FIG. 2 for example). Moreover a section 504 may list a set of orders or exception record files 170 that exist for the selected data source in section 502. Thus, in the example screen 500 of FIG. 8A, the field 502 lists the workflow data source and the section 504 lists a number of various exception record files for orders or batch runs managed by the workflow application. Still further, a section 506 may list the exception records within a particular file (e.g., order) as selected in the section 504. The user may scroll down through the list 506 to select different ones of the exception records 506A-506N. Still further a section 508 of the screen 500 may present information for the exception record 506A-N as selected in the section 506. In this example, the user has selected exception record 506B and the application 128 obtains information for the selected exception record 506B from the exception record log database 126 and displays that information for use and manipulation by the user. The section 508 may include various information for the selected exception record, such as the name, type, severity, information for and review or handling procedures for the exception.

Importantly, the displayed information for the exception record may include process or data source metadata 510 as collected from the data source at the time of the creation of the exception. As described above, the quality review management system 112 collects a set of metadata (which may be predefined when, for example, creating a plug-in or a rule or which may be data known to be provided by a particular data source) when collecting the input data from a data source. Generally, the metadata to be collected is defined by a data transform that is configured when creating a rule. The data transform is applied to the metadata from the data source and the plug-in outputs this transformed metadata in, for example, HTML, so that the metadata is viewable in the reviewing application. This data source metadata, which may be any process or environment data, is generally collected at the same time as the exception input data, and is stored as a process snapshot associated with the accessed exception data as part of the exception record created for the exception. As such, when the exception engine 122 detects an exception based on the collected exception data, the exception engine 122 also stores the data source metadata as part of the exception record. The quality review interface application 128 then displays some or all of this metadata in, for example, the field 510 of the screen 500 reporting the generated exception, thereby providing the reviewer with a live view into the process at the time that the exception arose within the process. This feature thus provides the reviewer with a quick view of various process states/values, etc. at the time of the exception, which enables the reviewer to more quickly understand why the exception arose, the context of the exception, etc., thus enabling the reviewer to more quickly process or know how to resolve the exception. This operation makes quality review easier because, while known quality review products generally provide a list of generated exceptions to a reviewer, the reviewer must still analyze each exception to determine whether the exception can be dismissed or must be dealt with in some other manner and, in these known products, the reviewer must typically go back to the process system in which the data that lead to the exception was collected to get process snapshot data at the time of the exception. With the live view feature provided by the metadata field 510 of the screen 500, the reviewer is automatically provided with a process snapshot that will generally include the process data most useful to the reviewer in performing exception review, which means that the reviewer does not need to go back into other data collection systems to get the information the user needs to perform exception review and handling. This feature also means that the reviewer does not generally need to be as familiar with other process data retrieval systems from which the process or data source metadata is usually collected, as the reviewer will not generally need to use those data collection systems to access the process data the reviewer needs to resolve exception records.

Still further, as illustrated in FIG. 8A, a section 512 may provide the user with a set of options or information with respect to the manner of handling or resolving the exception, e.g., review steps or procedures, checklists of actions to perform to close the exception, sign off fields need to be filled out or signed by various users to close the exception, etc.

FIG. 8B depicts an example screen display 520 illustrating some of the information for an exception record of the type Workflow Comment. Here, the workflow exception in the screen section 506 is the only exception listed for the selected order. As illustrated in the section 508 of the screen 520, the workflow comment has a status of NEW, a severity of LOW, does not have or is not associated with a corrective and preventative action (CAPA) identifier (which may be used to define a reference to a third party system that may also be used to view and/or process the exception) and also is not assigned to any groups. The section 508 however displays an exception ID (as each exception will have a unique ID), a source indication, and a creation date/time for the exception, all of which data is stored as part of the exception record. Still further, the section 508 includes a general description of the exception which may also be information stored as part of the exception record. However, this data may be stored as part of the review application 128 and may be based on the exception type.

Likewise, the bottom portion of the screen section 508 depicts the metadata collected for this particular exception. In this case, the metadata reflects what a user was seeing in the workflow application when the exception was created and may be used to assist the reviewer in understanding the context of the process when the exception occurred.

Still further, an example screen 530 of FIG. 8C provides a list of resolution fields that may be provided to a reviewer within the screen section 508 of FIG. 8B to perform handling or closing of an exception record. Here, the resolutions may be configurable as desired (and thus a similar screen may also be used in the configuration application 120 to generate a rule for an exception). In any event, as indicated in FIG. 8C, the resolution fields may include a resolution name or type 532 (e.g. standard), a description 534, one or more stage names 536 (e.g., Manufacturing or Manufacturing Supervisor), a severity 538 (e.g. Low), and signatures 539 needed by personnel in one or more stages to close or resolve the exception. In this case, the resolution of the example exception record displayed in FIG. 8C indicates that the exception must be signed by two operators (in the manufacturing stage) and one supervisor (in the manufacturing supervisor stage) to close or resolve the exception. These handling procedures may be implemented in the section or field 512 of FIG. 8A in the form of signature boxes, check boxes, etc. Moreover, the reviewer may be able to change these procedures on an exception by exception basis or may be able to group exceptions and take steps based on the group.

Figure 8D:
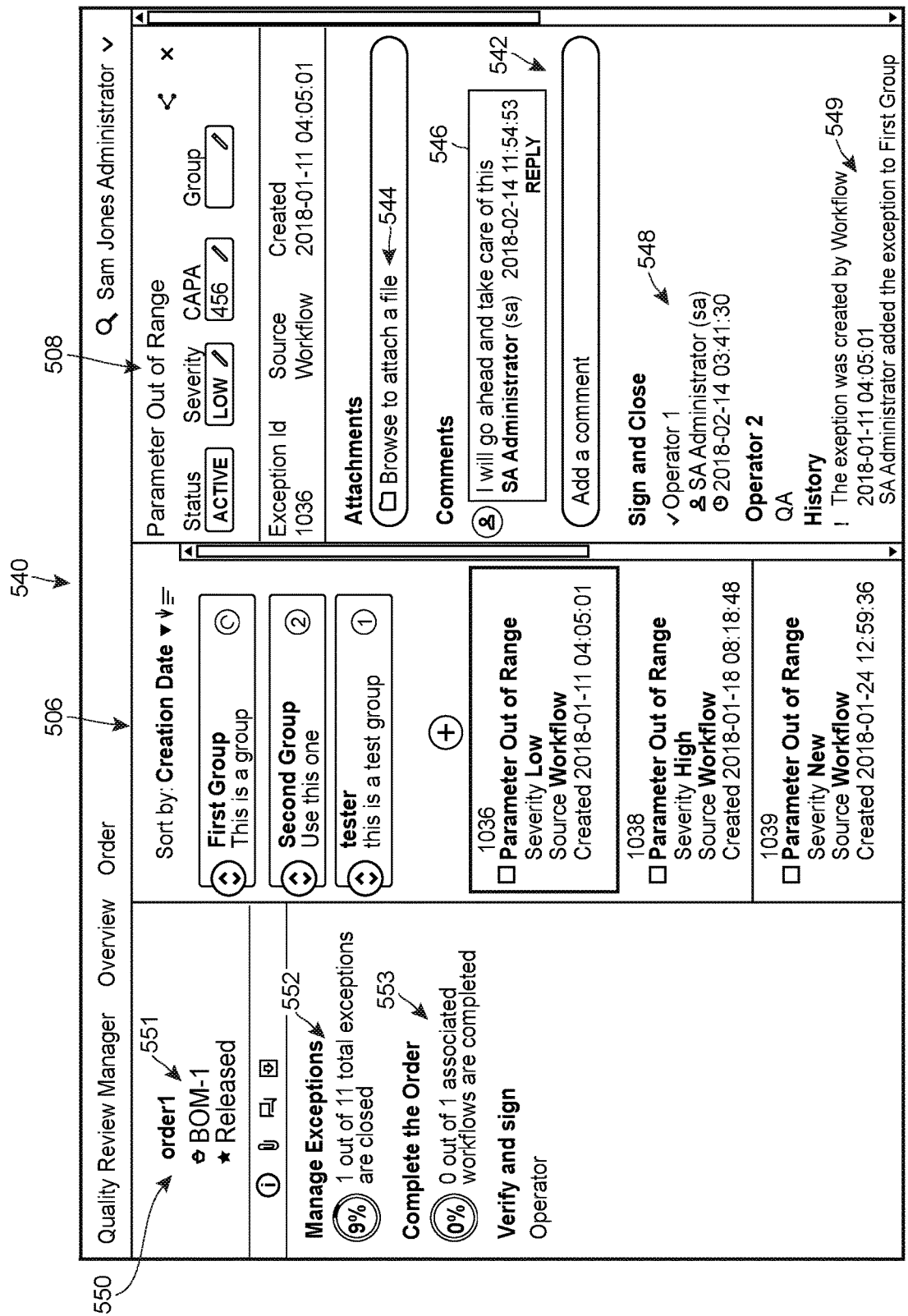

FIG. 8D, as an example, illustrates an example screen display 540 that includes a screen section 508 having a resolution field 542 for a selected Parameter out of Range exception. Again, here, the screen 540 includes some information about the selected exception record, including a status (Active), a severity (Low), a CAPA identifier and a group designation if any. The resolution section 542 includes fields 544 that enable the reviewer to browse to attach a file to the exception record (which may be useful later when the exception records for the order are being reviewed by a customer, the FDA, etc.), and a comments field 546 which enables reviewers to add comments or notes to the exception record (here an SA administrator has commented that she will take care of closing the exception record). Of course, additional comments can be added using the field 546. Additionally the screen section 508 of the screen 540 includes a sign and close field 548 which may be used by the various required signatories to close the exception record. Still further, the screen section 508 may include a history field 549 indicating actions taken to the exception record while processing the record, including what action was taken, who took the action and the time and date of the action. This information may be captured by the review interface application 128 and stored as part of the exception record.

Likewise, the various screens presented by the quality review interface application 128 may include statistical information about an order or a group of orders. For example, a section 550 of the screen 540 includes an indication 551 of the order being viewed, an indication 552 of the number of exception records associated with the order that are closed, and an indication 553 of the completion status of the order (in this case the order is not yet complete but is still being processed). The section 550 may also provide links 553 for reviewers to sign and verify the order or exception records of the order, etc.

Figure 8E:
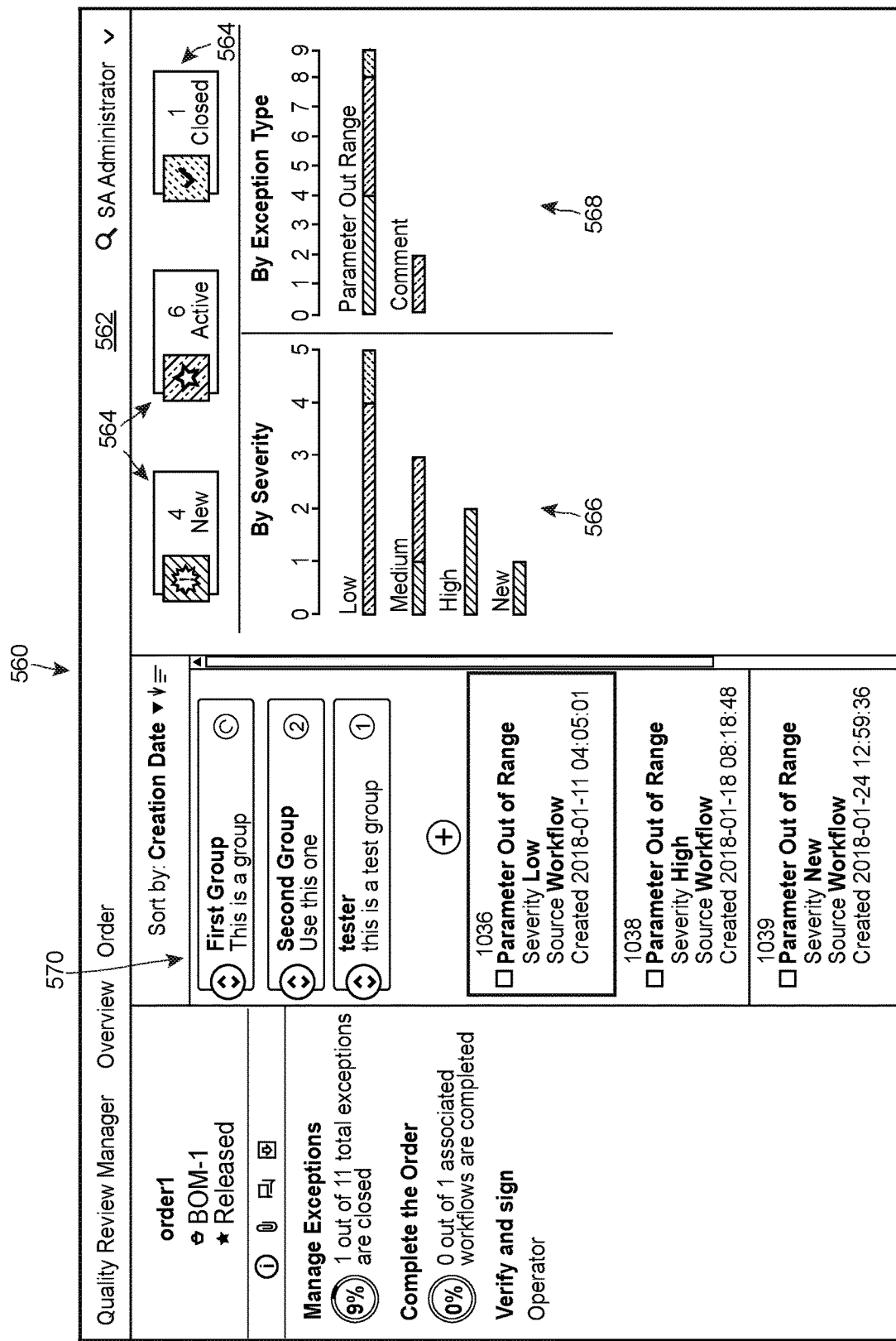

Likewise, a screen 560 of FIG. 8E illustrates additional statistical information that the quality review application 128 may determine and provide to a reviewer on an order by order or group by group basis. The screen 560 of FIG. 8E is similar to that of 540 of FIG. 8D except that a section 562 displays various statistical information about the 11 exception records in the selected order. In this case, the boxes 564 indicate the number of exception records for the order that are in each status category (New, Active, and Closed). Moreover, bar graphs 566 indicate the number of exception records for the order by each severity category (five are low, three are medium, two are high, and one is new). Still further, bar graphs 568 indicate the number of exceptions of the order in each exception type (nine are parameter out of range type, and two are comment type). Of course, the quality review application 128 may provide other types of statistical information about exception records and may provide statistical information in other manners, such as for groups of orders, subsets of records within an order or group, etc.

Still further, the quality review interface application 128 may enable a reviewer to group various ones of the exception records together into a group and take various actions (commenting on, changing parameters of, signing off on, etc.) of the records as a group. As an example, each of the screens 540 and 560 of FIGS. 8D and 8E include a listing 570, within the list of exception records, of three groups of records, namely First Group, Second Group and Tester. The application 128 may enable a reviewer to add exception records to a group by, for example, selecting an exception record in the exception record list 506 and dragging and dropping the selected exception record to a group in the list 570. Of course, the application 128 may enable a reviewer to create new groups, delete groups, etc. as desired in any suitable manner.

Still further, the application 128 may enable a reviewer to take one or more actions to exception records on a group basis, which saves time for the reviewer. FIG. 8F depicts an example screen 580 in which a reviewer has selected the group Tester for a group action. As a result of this selection, the application displays a pop-up window 582 of potential actions to be taken on the group of exception records in the group Tester. Such actions may include changing the severity of the exceptions in the group (via a drop-down input box 584), changing the CAPA identifier for the exception records in the group (via a drop-down input box 586), adding a comment to each of the exception records in the group (via an input box 588), attaching a document to each exception record in the group (via a box 590), and signing and closing the exception records in the group via a link 592. Of course, the application 128 may enable the reviewer to take any other action or actions on a selected group of exception records and may do so in any other manner via an interface device.

If desired, the quality review interface application 128 may enable a reviewer to take group actions on exception records not actually associated with a group. For example, as illustrated in an example screen display 592 of FIG. 8G, the reviewer may select a check box for various exception records in the list 506 (the first two exception records are so checked in the example of FIG. 8G). The application 128 may then recognize this as an attempt to take actions on both of the checked exception records and may provide a pop-up screen 594 including the various edit fields of FIG. 8F. However, in this case, the pop-up box 594 may include grouping actions that can be taken on the selected exception records, such as adding them to an existing group or creating a new group, as shown at the top of the pop-up box 594 of FIG. 8G.

The quality review interface application 128 as described herein may use an advantageous paging algorithm or technique to enable a reviewer to scroll through various pages of records, such as exception records as provided in the record lists 506 of FIGS. 8A, 8B, and 8D-8G, in a manner that reduces or eliminates presenting duplicate records in different pages or in missing records in the display when going between pages of records. Generally, web-based or browser based display systems that use a browser to display lists of organized records stored in a exterior structured database, such as an SQL database accessible via a network connection for example, search for the relevant records in the database and then present a number of the records that will fit onto a display page, e.g., 10 records at a time. Thus, these systems will typically first display the records in the first ten positions of the returned list. When the user wishes to see more records outside of the currently displayed list, the browser contacts the database with the same search and obtains the next set of records (e.g., the next 10 positions of records) if the user is scrolling down in the list of records or the previous set of records (e.g., the previous 10 positions of records) if the user is scrolling up in the list of records. Of course there can be a large number of exceptions or records and so the interface must scroll through numerous pages of records as the user scrolls down or up the list of records.

Thus, the browser of the display system will determine all of the relevant records associated with the query and present a first page as the first X number of records in the list, (e.g., if X is 10, records 1-10). When the user wants to look at records not in the first page, the system loads a second page as the second set of X records in the list (e.g., records in positions 11-20 of the list). The system then scrolls up or down in the list by X positions to present an earlier or the next page of records. When the list of records is static and does not change very often, this paging algorithm works well, as the system simply loads consecutive sets of X number of records as each new page.

However, when the records in the list or search change, such as when some of the records disappear or fall off of the search because some parameter of the record is changed, or when new records are created in the database, the original list of records found by the search changes, and these changes may occur during the time that the reviewer is reviewing one page of records but before calling the next page of records. In this situation, as the reviewer processes the records and scrolls down the list of records as displayed on the user interface, the records may change in the database, and thus the page data may become out of date. In particular, records may be added or may be deleted from the database (or records may have parameters that change that cause the records to no longer be returned by the search according to the search criteria). As a result, when the display system attempts to present the records on a display screen for subsequent pages, various records referred to in the original search may be missing, causing visual data loss or duplication. In some cases, the user may miss a record going from one page to the next due to the deletion of a record on a particular recovered page. In other cases, the system may become confused as to where to start a new display page based on missing records that were in the original returned list of records. In still another case, the display system may present the same record on multiple pages based on the addition of new records to the database. None of these situations is desirable in a review system in which it is important for the reviewer to view and sign off on each and every record in the list, as is the case with exception records in an exception record log for an order, as presented by the application 128.

Figure 9A:
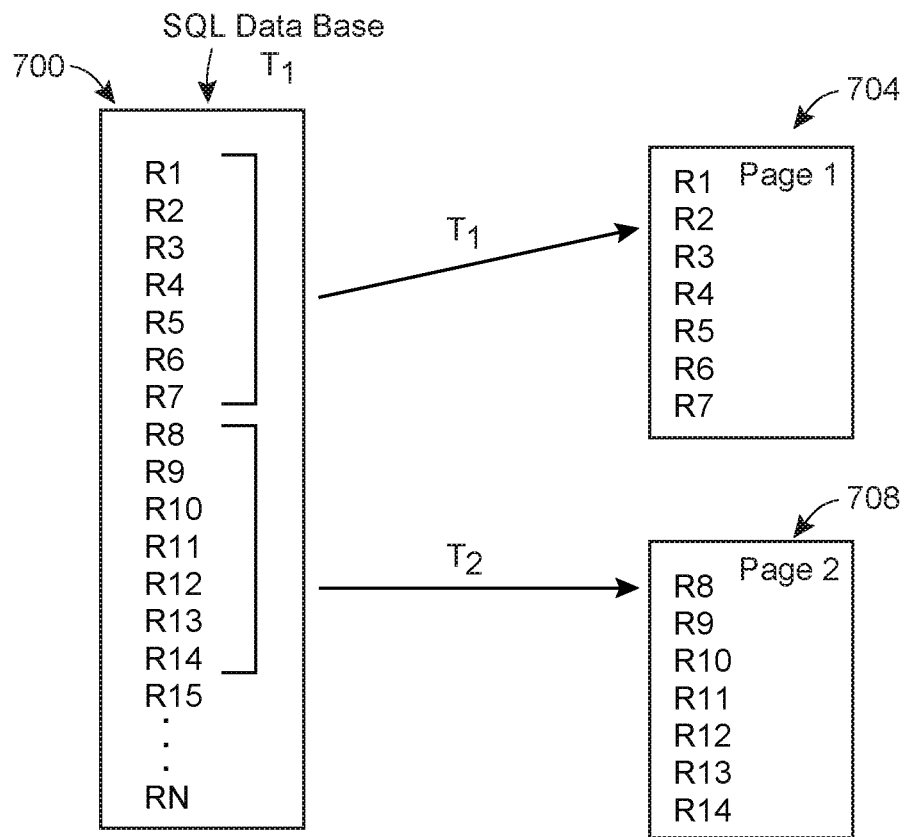
FIGS. 9A and 9B are diagrams illustrating the operation of a typical paging technique used to provide lists of records to a user in, for example, a web environment.
Figure 9B:
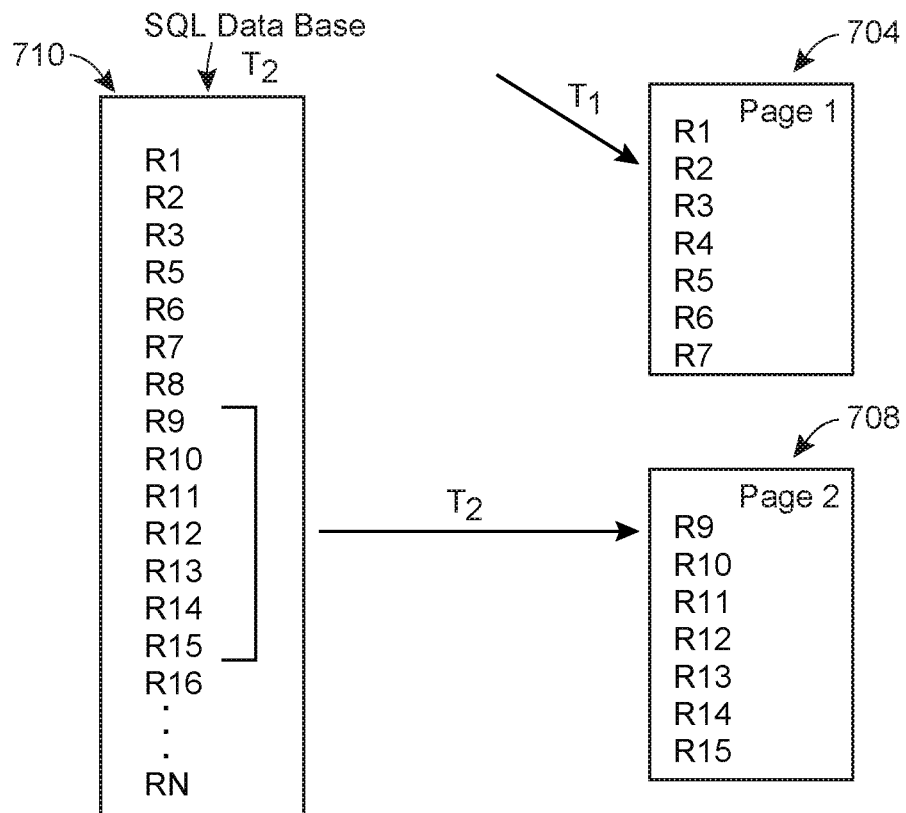

FIGS. 9A and 9B illustrate the problem discussed above in a typical browser based display interface that displays records as returned from a search of records stored in a database, wherein records may be added to or removed from or have parameters thereof changed in the database during the display activities. In particular, FIG. 9A illustrates a list of relevant records 700 returned from a search of a database at a time T1 (including records R1-RN), wherein the records R1-RN may be all of the records for an order, or may be some ordered list of records based on some other search criteria, such as all of the open records for an order, all of the records of a particular severity, etc. In any event, the display system (e.g., the browser at the user interface) may, at a first time $T_1$, receive the list 700, access the first seven records in the list 700 and present these seven records in a display screen 704 on the user interface as a first page of records. Thus, the display screen 704 includes records R1-R7 as the first page of records from the search. The display system may, at a later time $T_2$, such as when the user asks for the next page of records, access the database to obtain a list of the relevant records. Assuming no changes have been made to the records in the database, the same record list 700 will be returned at the time $T_2$ and the display system will simply access and display the set of records found in the second set of seven positions on the list (resulting in records R8-R14) as a second page of records in the display 708. This operation, which is illustrated in FIG. 9A, works fine if the ordered list of records 700 from the database remains static from time $T_1$ to time $T_2$.

However, if a record is removed from the list of relevant records (e.g., one or more records has a parameter thereof changed that keeps the record from being found in the search of records) between the time $T_1$ that the first page 704 is presented and the time $T_2$ that the second page 708 is presented, then the display system may inadvertently skip the display of a record. FIG. 9B illustrates an example in which the record R4 is removed from (or falls off of) the search list after the time $T_1$ at which the first page 704 has been presented in the display but before the time $T_2$ at which the second page 708 is presented. In this case, the browser of the display system obtains and displays the first seven records R1-R7 in page one 704 based on the list 700 as it is found in the database of FIG. 9A at time $T_1$. However, when the browner of the display system goes to access the records for the second page 708 in FIG. 9B, the browser simply accesses and uses the second set of seven records in the returned list 710, i.e., the records in positions 8-14, in the list 710 of FIG. 9B. Because, at this time, the record R4 has been removed (as it may have been closed and so removed or dropped from the list of relevant records), the display system displays records R9-R15 as the second page of records in the display 708 because record R8, which was originally in the eighth position in the list 700 of FIG. 9A when the first page was displayed, is now in the seventh position in the list 710 of FIG. 9B due to the removal of record R4 between the time $T_1$ and $T_2$. As such, the record R8 is not shown in either of the first or second pages 704 or 708 of the display of FIG. 9B, and so is missed by the reviewer. Of course, a similar situation occurs when a record is added to the list or database during the paging process, but in this case, one or more records may be duplicated or presented in consecutive pages due to the addition of a record causing a particular record that was originally in a position associated with one page to become located in a position associated with a different page at a later time.

This situation is disadvantageous when a reviewer is scrolling through pages of exception records which have parameters that can change or in which new records can be added because it leads to situations in which relevant records are skipped in the display or in which relevant records are duplicated in the different pages of the display.

The quality review application 128 described herein, however, may use a different paging technique to determine which records to present in various different pages of displays, and this new paging technique reduces or eliminates the display of duplicate and/or missing records when going between different pages. In particular, the quality review application 128 does not use fixed or preset locations or record positions in the list of records returned from the database to perform paging, but instead uses a dynamic paging algorithm that marks one or more records, such as a first record or a last record or both a first and a last record in the most recently displayed page, and then uses that marker or anchor to find the set of records to display as part of the next page of the display. In this manner, if any records are added to or are deleted from the relevant list of records after a page is displayed, the set of records displayed in the next page will be the records in the list that are adjacent to one of the last displayed records (e.g., the first or the last record of the previous page) at the time that the new page is loaded.

Figure 10A:
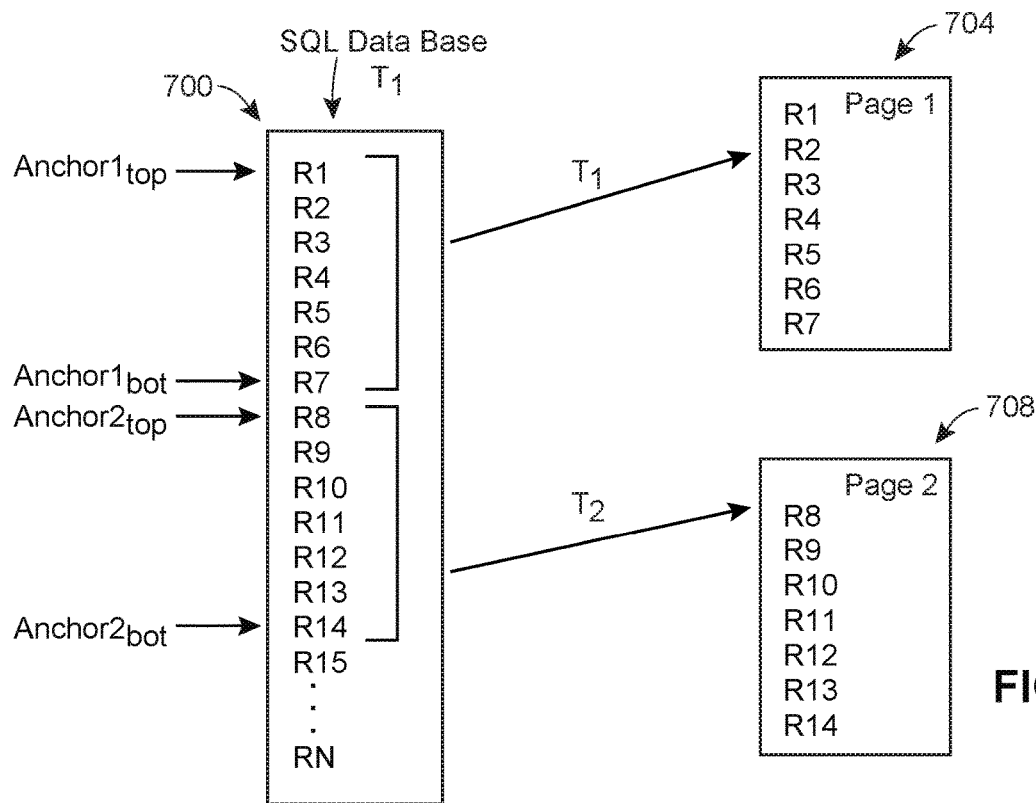
FIGS. 10A and 10B are diagrams illustrating the operation of a new paging technique that may be implemented by the quality review interface application of FIG. 2 to reduce or eliminate duplicate or missing records when performing paging through a set of records.
Figure 10B:
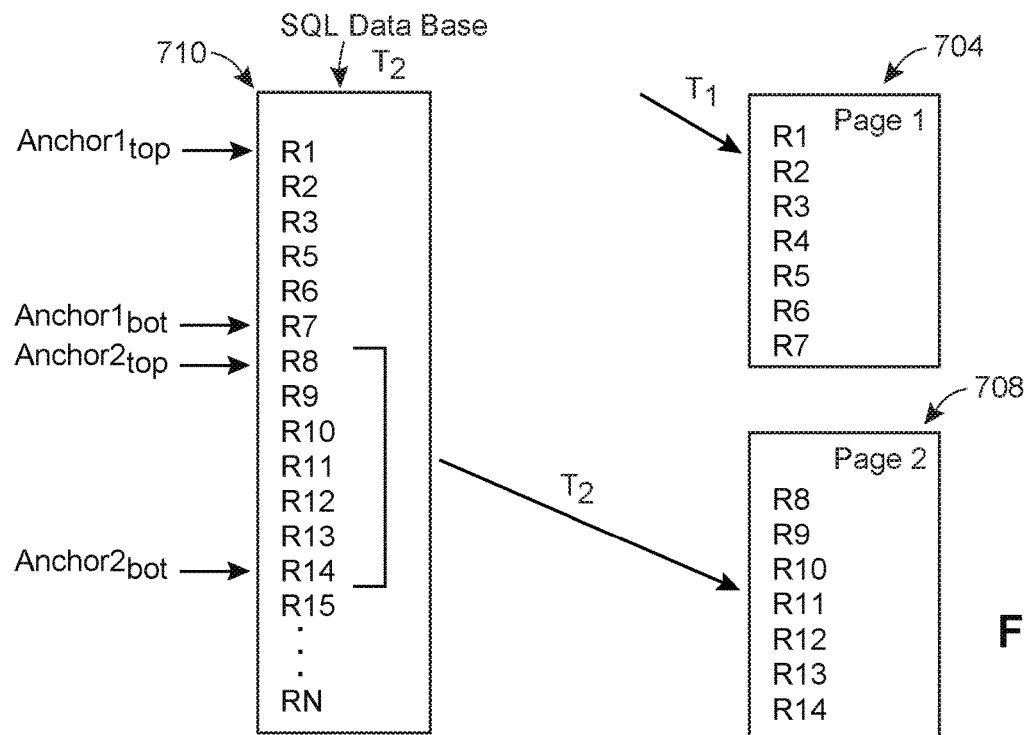

FIGS. 10A and 10B illustrate the operation of the new paging algorithm or technique used by the quality review interface application 128. In this case the lists of relevant records 700 and 710 of FIGS. 10A and 10B as returned from the database searches at times $T_1$ and $T_2$ include the same sets of relevant records as illustrated in FIGS. 9A and 9B, respectively. As illustrated in FIG. 10A, the interface application 128 presents a first page 704 as the first seven records in the display but marks the last or bottom record (R7) displayed in the first page 704 with an anchor (referred to as Anchor$1_{bot}$) indicating the last or bottom record in the currently displayed page. The application 128 may also mark the first or top record (R1) in the display 704 with a top anchor (referred to herein as Anchor$1_{top}$) indicating the top or first record in the currently displayed page. Then, when the application 128 loads the next page of records, page 2, the application 128 searches the returned list of records for the bottom anchor for page 1 (Anchor$1_{bot}$) without regard to the position in the returned list 700 or 710 at which this record is found. The application 128 then uses the next seven records in the list 700 immediately after the record marked with the bottom anchor of page 1, Anchor$1_{bot}$, for the list of records to display in page 2. The application 128 may also then remove the anchor Anchor$1_{bot}$ but may mark or store additional anchors for the next page of records (i.e., Anchor$2_{top}$ and Anchor$2_{bot}$) to mark the top and bottom records displayed in page 2 of the display 708. The application 128 then uses the record marked with Anchor$2_{bot}$ to determine which records to display in the next page (page 3) when the user scrolls down in the list of page 2 or uses the record marked with the Anchor$2_{top}$ to determine which records to display in a previous page (e.g., if the user scrolls up in the list of records in page 2 to go back to page 1). As will be understood, this paging technique places anchors or markers on records or stores anchors or markers indicating records in various positions of the current display page, and uses these anchors to determine which records in the returned set of records to use for the first (or last) record of the next page, without regard to the actual position of records in the returned list. As such, records can move up and down in positions within the database or returned list 700 between the display of different pages without upsetting the paging display in the manner illustrated in FIGS. 9A and 9B.

As an example, FIG. 10A illustrates the operation of the use of anchors when no changes are made to the database between the times $T_1$ and $T_2$, resulting in the presentation of records R1-R7 in the first page 704 and in records R8-R14 in the second page 708. FIG. 10B illustrates the operation of the use of the anchors within the list of records 710 when these anchors are used to perform paging at a time $T_1$ in which the returned record list is the list 700 of FIG. 10A and a time $T_2$ in which the returned record list is the list 710 of FIG. 10B. In particular, the display 704 for page 1 includes the records R1-R7 based on the state of the record list 700 in the database of FIG. 10A at time $T_1$ when page 1 was created. However, the application 128 upon loading page 1 marked the records R1 with the anchor Anchor$1_{top}$ and marked the record R7 with the anchor Anchor$1_{bot}$. Next, at the time $T_2$, when the display application 128 obtains the list of records 710 (which has now changed as record R4 is no longer in the list) to display page 2, the application 128 searches the returned list 710 for the record having been marked as the Anchor$1_{bot}$ record and upon finding this record in the list 710, simply loads and displays the next seven records (in this case records R8-R14) as the page 2 display 708, despite the fact that records R8-R14 are in the seventh through thirteenth positions in the list 710. Of course, the application 128 can mark any number of anchors per page, but will generally have two anchors per page to identify the top and bottom records in the current page, and will then load the records adjacent to or next to those anchors when loading subsequent pages. The use of two anchors enables the application 128 to scroll up and down in pages in a manner that eliminates or reduces missing records in the display or duplicating records in different pages when the states of the records in the list change (such a record being added to or removed from the list).

The application 128 can use any marking technique, such as storing an indication of the record(s) that is/are at the top and bottom anchor positions in a separate anchor variable (such as in the browser or browser device) while a particular page is being displayed, actually storing a marker in the database associated with a record that is currently in an anchor position in the currently displayed page of records, storing one or more of the records in the current page as the marker, placing a temporary marker in the database immediately before or after a marked record, etc. Additionally, the marker or anchor can be stored in the application 128, a browser used by the application 128, the database in which the records are stored, etc. Moreover, the application 128 moves or changes the anchor positions or markers as new pages are accessed and displayed. Still further, the application 128 may use any value as the anchor for a record. For example, the application 128 may use a parameter of the record at which the anchor is located as the anchor, such as the time/date stamp of the record, etc. In some cases, the anchor for a record may be based on or indicate a search parameter of the record or some combination of search parameters, or may be some other unique value of the record, such as a record name, identification number, etc. Likewise, in some cases, the record associated with the marker may be a record that drops off the relevant search list. In this case, the application 128, upon not finding the anchor record in the new list (when loading a new page) may change the anchor to the record in the currently displayed page that is adjacent to the now missing anchor record (e.g., the record in the currently displayed page immediately above or preceding the bottom anchor or the record in the currently displayed page immediately below or following the top anchor) and then use the new anchor to determine the set of records in the returned list to present in the new display page.

Thus, the paging algorithm used by the quality review interface application 128 operates better than past paging systems in that this new system downloads and presents records on a new display screen starting from the last record displayed on the previous page or screen, regardless of the positions of the records in the returned list. That is, instead of presenting a new display page associated with the position of records in the original list of recovered records, the system 128 accesses the database for the records that currently exist in the new list immediately after the last record on the currently displayed page (when paging down the list), thereby assuring that each time a new set of records is displayed on the screen, the first new record displayed is the record in the new search list (710) that immediately follows the last record that was displayed in the previous page from the previous search (700). This display system is more accurate as it helps to assure that records are not displayed out of order, that records are not duplicated in multiple display pages, and that records are not missed in the review process in which the user is scrolling through various pages of records over a long period of time during which changes are being made to the records in the database. Moreover, the review application 128 is more efficient, as it only needs to access the database for the number of new records that will fit on a new display page as the user is scrolling through records, while still assuring that all of the relevant records are accessed as the user performs the scrolling process.

It will be understood that the quality review management applications and the batch execution engines, server applications, plug-ins, etc. described herein can be used and implemented within any desired process plant environment, and may be used in any process plant control system using any desired type of process plant control communication protocol. While the applications and routines described herein are preferably implemented in software stored in, for example, a server, a workstation, a handheld device or other computer, these routines may alternatively or additionally be implemented in hardware, firmware, application specific integrated circuits, programmable logic circuits, etc., as desired. If implemented in software, the routines or applications may be stored in any computer readable memory such as on a magnetic disk, a laser disk, an EPROM or EEPROM, solid state or other storage medium, in a RAM or ROM of a computer, handheld device, controller, field device, etc. Likewise, this software may be delivered to a user or a device via any known or desired delivery method including, for example, over a communication channel such as a telephone line, the Internet, on a transportable medium, such as a computer-readable disk, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A quality review management system for use in reviewing the operation of a manufacturing process being implemented by manufacturing process equipment, comprising:
   a rules database;
   a configuration system communicatively coupled with a user interface and the rules database, that enables a user to create one or more rules via the user interface, wherein each of the rules identifies one or more exceptions within a manufacturing process, and that stores the one or more rules in the rules database; and
   an exception engine that processes data within a data message from the manufacturing process equipment using the rules in the rules database to determine if the data within the data message includes an exception as defined by one or more of the rules, wherein the exception engine, upon identifying an exception based on one of the rules, stores information about the exception as an exception record, and wherein the exception engine is configured to provide live feedback to a manufacturing process operator that an exception has occurred or is about to occur based on a detection of an exception as defined by the one or more of the rules, to enable the manufacturing process operator to take action within the manufacturing process to mitigate or avoid the exception.

2. The quality review management system of claim 1, wherein the configuration system generates a plurality of rules based on user input, wherein each of the plurality of rules identifies a set of conditions that must be met to identify an exception.

3. The quality review management system of claim 2, wherein each of the plurality of rules further identifies a severity of the identified exception.

4. The quality review management system of claim 2, wherein each of the plurality of rules further identifies information about the exception.

5. The quality review management system of claim 2, wherein each of the plurality of rules further identifies processes or procedures used to handle, resolve, or close the exception.

6. The quality review management system of claim 2, wherein each of the plurality of rules further identifies process data or other data to be stored as part of an exception record to assist a quality review engineer in understanding and resolving the exception.

7. The quality review management system of claim 1, wherein the exception engine receives data messages provided periodically by a data source within the manufacturing process equipment.

8. The quality review management system of claim 7, wherein the data source is one of a process control system, a batch executive, or an operator workflow application.

9. The quality review management system of claim 1, wherein the configuration system generates one or more rules, wherein each rule includes a rule name, a rule type, a rule severity, one or more procedures or steps to take to resolve or handle the exception associated with the rule, and process data pertaining to the operation of the manufacturing process in which the exception pertaining to the rule occurred at the time that the exception occurred.

10. The quality review management system of claim 1, wherein the exception engine stores data for each identified exception as an exception record in an exception file associated with an order.

11. The quality review management system of claim 1, wherein the exception engine operates in real time during operation of the manufacturing process implementing an order to create an exception file for the order.

12. The quality review management system of claim 1, wherein the configuration system includes a set of rule templates associated with different types of input data to detect an exception and the configuration system enables the user, via the user interface, to select one of the set of rule templates, and enables the user, via the user interface, to define rule parameters and rule inputs/outputs for the rule to be created using the selected rule template.

13. The quality review management system of claim 12, wherein the configuration system enables the user, via the user interface, to define a logical expression to be analyzed for a set of input data and rule parameters to be used in the logical expression to detect an exception.

14. A quality review management system, comprising:
a rules database that stores a plurality of rules, wherein each of the plurality of rules includes logic that identifies conditions associated with one or more exceptions within a manufacturing process;
an exception engine that processes data within a data message from manufacturing process equipment using the rules in the rules database to determine if an exception exists as defined by any of the plurality of rules, wherein the exception engine, upon identifying an exception based on one of the rules, stores information about the exception as an exception record, and wherein the exception engine notifies a user, via a user interface, of a detected exception during on-line operation of the manufacturing process equipment; and
a review interface that enables a user to handle exceptions as identified by the exception engine and as stored as the exception records in an exception database, wherein the review interface accesses the exception database, presents information regarding one or more identified exceptions to a user via the user interface and provides the user with data stored for each exception record and that enables the user to take an action with respect to each exception record, including taking action within the manufacturing process to mitigate or avoid the exception.

15. The quality review management system of claim 14, wherein the review interface provides the user, for each exception record, a type of an exception or a severity of an exception.

16. The quality review management system of claim 14, wherein the review interface provides the user, for each exception record, data pertaining to one or more process variables, states, or procedures that existed at the time that the exception occurred.

17. The quality review management system of claim 14, wherein the exception engine stores, for each exception, an order which was being processed at the time of the exception, and wherein the review interface provides the user a group of exceptions for a particular order.

18. The quality review management system of claim 14, wherein the review interface enables the user to acknowledge an exception.

19. The quality review management system of claim 14, wherein the review interface enables the user to sign off on or close an exception.

20. The quality review management system of claim 14, wherein the review interface enables the user to annotate an exception record with further information.

21. The quality review management system of claim 14, wherein the review interface enables the user to send an exception record to another person.

22. The quality review management system of claim 14, wherein the review interface provides the reviewer with one or more suggested or mandatory actions to be performed based on the exception.

23. The quality review management system of claim 22, wherein the review interface forces the user to obtain a sign-off by a certain number or type of people or requires certain information to be provided from the reviewer that will be stored with the exception record for later use.

24. The quality review management system of claim 14, wherein the review interface stores the processed exception records in a database and enables the user to scroll through the exception records in the exception database to determine if and when all of the exception records for an order have been processed or closed, a status of the review, or statistical data pertaining to the exception records.

25. The quality review management system of claim 14, wherein the review interface enables the user to group exception records in one or more different manners.

26. The quality review management system of claim 14, wherein the review interface enables the user to take one or more actions on an entire group of exception records.

27. The quality review management system of claim 14, wherein the exception engine receives process data within data messages from manufacturing process equipment during on-line operation of the manufacturing process equipment and uses the rules in the rules database to determine if an exception exists during on-line operation of the manufacturing process equipment.

28. The quality review management system of claim 14, further including a configuration system communicatively coupled with a user interface and the rules database, that enables a user to create one or more rules via the user interface, wherein each of the rules identifies one or more exceptions within a manufacturing process, and that stores the one or more rules in the rules database for use by the exception engine.

29. A method of analyzing the operation of a manufacturing process being implemented by manufacturing process equipment, comprising:
  enabling a user, via a user interface coupled to a processor, to specify rule definition data for one or more rules;
  creating, using a processor, one or more rules based on the specified rule definition data, wherein each of the one or more rules identifies one or more exceptions within a manufacturing process;
  storing the one or more rules in the rules database; and
  during operation of the manufacturing process, receiving one or more data messages from the manufacturing process equipment including process data;
  processing the process data within the data messages from the manufacturing process equipment using the rules in the rules database to determine if the data within the data message includes an exception as defined by one or more of the rules;
  upon identifying an exception based on one of the rules, storing information about the exception as an exception record in a further database; and
  providing live feedback to a manufacturing process operator that an exception has occurred or is about to occur based on a detection of an exception by one or more of the rules, to enable the manufacturing process operator to take action within the manufacturing process to mitigate or avoid the exception.

30. The method of analyzing the operation of a manufacturing process of claim 29, wherein enabling the user to specify rule definition data includes presenting to the user, via the user interface, one or more rule templates defining different types of rules and enabling the user to select one of the one or more rule templates to use to create the rule.

31. The method of analyzing the operation of a manufacturing process of claim 30, wherein enabling the user to specify rule definition data includes presenting to the user, via the user interface, a plurality of data fields to be filled out for the selected rule template to define the rule.

32. The method of analyzing the operation of a manufacturing process of claim 29, wherein enabling the user to specify rule definition data includes enabling a user to specify a set of conditions that must be met to identify an exception in the operation of the process.

33. The method of analyzing the operation of a manufacturing process of claim 29, wherein enabling the user to specify rule definition data includes enabling the user to identify a severity of the identified exception.

34. The method of analyzing the operation of a manufacturing process of claim 29, wherein enabling the user to specify rule definition data includes enabling the user to identify information about the exception to be presented when the exception is found to exist in the manufacturing process.

35. The method of analyzing the operation of a manufacturing process of claim 29, wherein enabling the user to specify rule definition data includes enabling the user to identify processes or procedures to be used to handle, resolve, or close the exception.

36. The method of analyzing the operation of a manufacturing process of claim 29, wherein creating the one or more rules includes specifying process data or other data to be stored as part of an exception record to assist a quality review engineer in understanding and resolving the exception.

37. The method of analyzing the operation of a manufacturing process of claim 29, wherein receiving one or more data messages from the manufacturing process equipment includes receiving the data messages periodically by a data source within the manufacturing process equipment.

38. The method of analyzing the operation of a manufacturing process of claim 29, wherein receiving one or more data messages from the manufacturing process equipment includes receiving the one or more data messages from one of a process control system, a batch executive, or an operator workflow application.

39. The method of analyzing the operation of a manufacturing process of claim 29, wherein creating the one or more rules includes creating each of the one or more rules to include a rule name, a rule type, a rule severity, one or more procedures or steps to take to resolve or handle the exception associated with the rule, and process data pertaining to the operation of the manufacturing process in which the exception pertaining to the rule occurred at the time that the exception occurred.

40. The method of analyzing the operation of a manufacturing process of claim 29, wherein processing the process data within the data messages from the manufacturing process equipment includes operating in real time during operation of the manufacturing process implementing an order and wherein storing information about the exception as an exception record in a further database includes storing data for each identified exception as an exception record in an exception file associated with the order.

41. A method of performing quality review in a manufacturing process, comprising:
  storing a plurality of rules in a rules database, wherein each of the plurality of rules includes logic that identifies conditions associated with one or more exceptions within the manufacturing process;
  receiving one or more data messages from manufacturing process equipment during operation of the manufacturing process;
  processes the data messages, using a processor device, using the rules in the rules database to determine if an exception exists as defined by any of the plurality of rules;
  upon identifying an exception based on one of the rules, storing information about the exception as an exception record in a further database; and
  enabling a user, via a user interface and a processing device, to handle identified exceptions as stored as the exception records in the exception database, including accessing the exception database, presenting information regarding one or more identified exceptions to a user via the user interface, providing the user with data stored for each exception record, notifying a user, via a user interface, of a detected exception during on-line operation of the manufacturing process equipment, and enabling the user to take an action with respect to each exception record, including taking action within the manufacturing process to mitigate or avoid the exception.

42. The method of performing quality review of claim 41, wherein presenting information regarding one or more identified exceptions to a user via the user interface includes providing the user, for each exception record, a type of an exception or a severity of an exception.

43. The method of performing quality review of claim 41, wherein presenting information regarding one or more identified exceptions to a user via the user interface includes providing the user, for each exception record data pertaining to one or more process variables, states, or procedures that existed at the time that the exception occurred.

44. The method of performing quality review of claim 41, wherein presenting information regarding one or more identified exceptions to a user via the user interface includes providing the user an identification of a particular order which was being processed, and a group of exceptions for the particular order.

45. The method of performing quality review of claim 41, wherein enabling the user to take an action with respect to each exception record includes enabling the user to electronically acknowledge an exception.

46. The method of performing quality review of claim 41, wherein enabling the user to take an action with respect to each exception record includes enabling the user to electronically sign off on or close an exception.

47. The method of performing quality review of claim 41, wherein enabling the user to take an action with respect to each exception record includes enabling the user to electronically annotate an exception record with further information.

48. The method of performing quality review of claim 41, wherein enabling the user to take an action with respect to each exception record includes enabling the user to electronically send an exception record to another person.

49. The method of performing quality review of claim 41, wherein providing the user with data stored for each exception record includes providing the user with one or more suggested or mandatory actions to be performed for each exception record.

50. The method of performing quality review of claim 41, including enabling the user to scroll through the exception records in the exception database to determine if and when all of the exception records for an order have been processed or closed, a status of the review, or statistical data pertaining to the exception records.

51. The method of performing quality review of claim 41, including enabling the user to group exception records in one or more different manners and to take one or more actions on an entire group of exception records.

52. The method of performing quality review of claim 41, including receiving process data within data messages from manufacturing process equipment during on-line operation of the manufacturing process equipment and using the rules in the rules database to determine if an exception exists during on-line operation of the manufacturing process equipment.

53. The method of performing quality review of claim 41, further including enabling, via a processor device, a user to create one or more rules via the user interface, wherein each of the rules identifies one or more exceptions within a manufacturing process, and storing the one or more rules in the rules database for use in determining exceptions within the manufacturing process.

* * * * *

UNITED STATES PATENT AND TRADEMARK OFFICE
CERTIFICATE OF CORRECTION

Page 1 of 3

PATENT NO. : 11,726,447 B2
APPLICATION NO. : 17/063418
DATED : August 15, 2023
INVENTOR(S) : Joshua B. Kidd et al.

It is certified that error appears in the above-identified patent and that said Letters Patent is hereby corrected as shown below:

In the Drawings

At Fig. 5, Sheet 4 of 14, "Proccedure 1" should be -- Procedure 1 --.

At Fig. 5, Sheet 4 of 14, "Proccedure 2" should be -- Procedure 2 --.

At Fig. 8D, Sheet 9 of 14, "exeption" should be -- exception --.

At Fig. 8G, Sheet 12 of 14, "exeptions" should be -- exceptions --.

At Fig. 8G, Sheet 12 of 14, "exeptions" should be -- exceptions --.

At Fig. 9B, Sheet 13 of 14, "  " should be -- -- .

Signed and Sealed this
Tenth Day of February, 2026

John A. Squires
*Director of the United States Patent and Trademark Office*

CERTIFICATE OF CORRECTION (continued)
U.S. Pat. No. 11,726,447 B2

At Fig. 10B, Sheet 14 of 14, "R1 R2 R3 R5 R6" should be --R1 R2 R3 R4 R5 R6--.

In the Specification

At Column 6, Line 36, "completed" should be -- is completed --.

At Column 6, Line 48, "out an" should be -- out of an --.

At Column 9, Line 57, "how may" should be -- how many --.

At Column 11, Line 24, "needs" should be -- needs. --.

At Column 16, Line 11, "then" should be -- than --.

At Column 16, Line 47, "data base" should be -- database --.

At Column 22, Line 66, "indicted" should be -- indicated --.

At Column 24, Line 44, "one more" should be -- one or more --.

At Column 26, Lines 57-58, "one more" should be -- one or more --.

At Column 28, Line 34, "and or" should be -- and/or --.

At Column 29, Line 29, "such" should be -- such as --.

At Column 29, Line 55, "check box" should be -- checkbox --.

At Column 32, Line 1, "check boxes," should be -- checkboxes, --.

At Column 33, Line 32, "check box" should be -- checkbox --.

At Column 33, Line 49, "or in" should be -- or --.

At Column 34, Line 51, "T1" should be -- $T_1$ --.

At Column 35, Line 20, "browner" should be -- browser --.

In the Claims

At Column 41, Line 19, "database; and" should be -- database; --.